(12) United States Patent
Laramie et al.

(10) Patent No.: US 11,322,804 B2
(45) Date of Patent: May 3, 2022

(54) ISOLATABLE ELECTRODES AND ASSOCIATED ARTICLES AND METHODS

(71) Applicant: Sion Power Corporation, Tucson, AZ (US)

(72) Inventors: Michael G. Laramie, Tucson, AZ (US); Daniel G. Milobar, Tucson, AZ (US); Yuriy V. Mikhaylik, Tucson, AZ (US); Chariclea Scordilis-Kelley, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 138 days.

(21) Appl. No.: 16/724,586

(22) Filed: Dec. 23, 2019

(65) Prior Publication Data
US 2020/0220146 A1    Jul. 9, 2020

Related U.S. Application Data

(60) Provisional application No. 62/785,332, filed on Dec. 27, 2018.

(51) Int. Cl.
*H01M 4/02* (2006.01)
*H01M 50/531* (2021.01)
*H01M 10/44* (2006.01)
*H01M 50/581* (2021.01)

(52) U.S. Cl.
CPC ....... *H01M 50/531* (2021.01); *H01M 10/443* (2013.01); *H01M 50/581* (2021.01); *H01M 2200/10* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 4,954,371 | A | 9/1990 | Yializis |
| 5,194,341 | A | 3/1993 | Bagley et al. |
| 5,529,860 | A | 6/1996 | Skotheim et al. |
| 5,538,812 | A | 7/1996 | Lee et al. |

(Continued)

FOREIGN PATENT DOCUMENTS

| | | |
|---|---|---|
| EP | 1 079 454 A2 | 2/2001 |
| EP | 1 132 987 A2 | 9/2001 |

(Continued)

OTHER PUBLICATIONS

Invitation to Pay Additional Fees for International App. No. PCT/US2019/068244 mailed Apr. 20, 2020.

(Continued)

*Primary Examiner* — Jacob B Marks
(74) *Attorney, Agent, or Firm* — Wolf, Greenfield & Sacks, P.C.

(57) ABSTRACT

Articles containing electrodes and current collectors arranged such that at least one electrode can be electronically isolated from other components of the article and/or an electrochemical device, and associated systems and methods, are provided. In some cases, the articles contain substrates for which a change in volume of the substrate causes at least one electrode to become electronically isolated from other components of the article and/or an electrochemical device. In certain cases, heating the substrate causes the change in volume of the substrate.

54 Claims, 16 Drawing Sheets

(56) References Cited

U.S. PATENT DOCUMENTS

| | | |
|---|---|---|
| 5,648,187 A | 7/1997 | Skotheim |
| 5,681,615 A | 10/1997 | Affinito et al. |
| 5,919,587 A | 7/1999 | Mukherjee et al. |
| 5,961,672 A | 10/1999 | Skotheim et al. |
| 6,153,337 A | 11/2000 | Carlson et al. |
| 6,238,821 B1 | 5/2001 | Mukherjee et al. |
| 6,306,545 B1 | 10/2001 | Carlson et al. |
| 6,423,449 B1 | 7/2002 | Hong |
| 6,679,926 B1 | 1/2004 | Kajiura et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 6,997,228 B2 | 2/2006 | Hong |
| 7,033,701 B2 | 4/2006 | Hong |
| 7,055,570 B2 | 6/2006 | Hong |
| 7,247,408 B2 | 7/2007 | Skotheim et al. |
| 7,500,304 B2 | 3/2009 | Hong |
| 7,618,736 B2 | 11/2009 | Shen et al. |
| 7,688,075 B2 | 3/2010 | Kelley et al. |
| 7,767,189 B2 | 8/2010 | Liu et al. |
| 7,771,870 B2 | 8/2010 | Affinito et al. |
| 7,785,730 B2 | 8/2010 | Affinito et al. |
| 7,887,955 B2 | 2/2011 | Saruwatari et al. |
| 7,906,233 B2 | 3/2011 | Wang et al. |
| 7,923,152 B2 | 4/2011 | Inagaki et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,440,356 B2 | 5/2013 | Kim et al. |
| 8,460,828 B2 | 6/2013 | Kim et al. |
| 8,603,680 B2 | 12/2013 | Affinito et al. |
| 8,617,257 B2 | 12/2013 | Kadowaki et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,246,185 B2 | 1/2016 | Kretschmar et al. |
| 9,343,779 B2 | 5/2016 | Do et al. |
| 9,397,342 B2 | 7/2016 | Skotheim et al. |
| 9,419,274 B2 | 8/2016 | Wilkening et al. |
| 9,431,679 B2 | 8/2016 | Kwon et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,660,296 B2 | 5/2017 | Kim et al. |
| 9,666,907 B2 | 5/2017 | Wang et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,786,891 B2 | 10/2017 | Choi et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 2001/0014420 A1 | 8/2001 | Takeuchi et al. |
| 2003/0013007 A1 | 1/2003 | Kaun |
| 2004/0142235 A1 | 7/2004 | Parsian |
| 2005/0196672 A1 | 9/2005 | Mukherjee et al. |
| 2006/0115579 A1 | 6/2006 | Mukherjee et al. |
| 2006/0238203 A1 | 10/2006 | Kelley et al. |
| 2007/0221265 A1 | 9/2007 | Affinito et al. |
| 2007/0224502 A1 | 9/2007 | Affinito et al. |
| 2008/0187663 A1 | 8/2008 | Affinito |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2009/0200986 A1 | 8/2009 | Kopera |
| 2010/0015529 A1 | 1/2010 | Kim et al. |
| 2010/0035128 A1 | 2/2010 | Scordilis-Kelley et al. |
| 2010/0129699 A1 | 5/2010 | Mikhaylik et al. |
| 2010/0161354 A1 | 6/2010 | Lim et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0052964 A1 | 3/2011 | Kim et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0208066 A1 | 8/2012 | Schaefer et al. |
| 2013/0017441 A1 | 1/2013 | Affinito et al. |
| 2013/0316072 A1 | 11/2013 | Scordilis-Kelley et al. |
| 2014/0062411 A1 | 3/2014 | Mikhaylik et al. |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2015/0162586 A1 | 6/2015 | Fleischmann et al. |
| 2015/0188194 A1 | 7/2015 | Mikhaylik et al. |
| 2015/0236322 A1 | 8/2015 | Laramie et al. |
| 2015/0287986 A1 | 10/2015 | Affinito et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |

(56) References Cited

U.S. PATENT DOCUMENTS

| | | |
|---|---|---|
| 2017/0141385 A1 | 5/2017 | Scordilis-Kelley et al. |
| 2017/0141402 A1 | 5/2017 | Affinito et al. |
| 2017/0250390 A1 | 8/2017 | Laramie et al. |
| 2017/0338475 A1 | 11/2017 | Laramie et al. |
| 2018/0006303 A1 | 1/2018 | Mikhaylik et al. |
| 2018/0138542 A1 | 5/2018 | Bunte et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0277850 A1 | 9/2018 | Quero-Mieres et al. |
| 2018/0301697 A1 | 10/2018 | Affinito et al. |
| 2018/0337406 A1 | 11/2018 | Mudalige et al. |
| 2018/0351148 A1 | 12/2018 | Schneider et al. |
| 2018/0351158 A1 | 12/2018 | Liao et al. |
| 2018/0358651 A1 | 12/2018 | Liao et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0267632 A1 | 8/2019 | Affinito et al. |
| 2019/0267669 A1 | 8/2019 | Mikhaylik et al. |
| 2019/0348672 A1 | 11/2019 | Wang et al. |
| 2019/0386334 A1 | 12/2019 | Scordilis-Kelley et al. |
| 2020/0044460 A1 | 2/2020 | Mikhaylik et al. |
| 2020/0091547 A1 | 3/2020 | Scordilis-Kelley et al. |
| 2020/0220149 A1 | 7/2020 | Laramie |
| 2020/0220197 A1 | 7/2020 | Laramie et al. |

FOREIGN PATENT DOCUMENTS

| | | |
|---|---|---|
| EP | 1 381 097 A1 | 1/2004 |
| EP | 2 149 927 A1 | 2/2010 |
| EP | 2 750 241 A1 | 7/2014 |
| EP | 2 858 165 A1 | 4/2015 |
| EP | 2 996 188 A1 | 3/2016 |
| JP | S49-129836 A | 12/1974 |
| JP | S49-148428 U | 12/1974 |
| JP | H05-314969 A | 11/1993 |
| JP | H09-17441 A | 1/1997 |
| JP | 2003-297427 A | 10/2003 |
| JP | 2006-187316 A | 7/2006 |
| JP | 2009-517168 A | 4/2009 |
| JP | 2015-026555 * | 2/2015 |
| JP | 2015-026555 A | 2/2015 |
| KR | 20070097725 A | 10/2007 |
| WO | WO 99/33125 A1 | 7/1999 |
| WO | WO 2004/114452 A1 | 12/2004 |
| WO | WO 2009/017726 A1 | 2/2009 |
| WO | WO 2009/042071 A2 | 4/2009 |
| WO | WO 2009/054987 A1 | 4/2009 |
| WO | WO 2009/061294 A1 | 5/2009 |
| WO | WO 2009/078632 A2 | 6/2009 |
| WO | WO 2009/089018 A2 | 7/2009 |

OTHER PUBLICATIONS

PCT/US2019/068244, Apr. 20, 2020, Invitation to Pay Additional Fees.
Alamgir et al., Lithium Batteries, New Materials, Developments and Perspectives, Chapter 3. Elsevier, Amsterdam. 1994; 93-136.
Dominey, Lithium Batteries, New Materials, Developments and Perspectives, Chapter 4. Elsevier, Amsterdam. 1994; 137-165.
Schmaljohann et al., Thin Film Sensors for Measuring Small Forces. Journal of Sensors and Sensor Systems. Feb. 2015;4:91-5.
PCT/US2019/068244, Jun. 30, 2020, International Search Report and Written Opinion.
International Search Report and Written Opinion for International App. No. PCT/US2019/068244 dated Jun. 30, 2020.
International Preliminary Report on Patentability for International App. No. PCT/US2019/068244 dated Jul. 8, 2021.

* cited by examiner

ISOLATABLE ELECTRODES AND ASSOCIATED ARTICLES AND METHODS

RELATED APPLICATIONS

This application claims priority under 35 U.S.C. § 119(e) to U.S. Provisional Application No. 62/785,332, filed Dec. 27, 2018, and entitled "Isolatable Electrodes and Associated Articles and Methods," which is incorporated herein by reference in its entirety for all purposes.

TECHNICAL FIELD

Articles, devices, systems, and methods related to the configuration of electrodes, current collectors, and/or substrates in electrochemical devices are generally described.

BACKGROUND

Typical batteries or battery packs include electrochemical cells containing anodes and cathodes that participate in chemical reactions. Batteries containing multiple electrochemical cells are typically configured with a stacked arrangement involving multiple discrete anodes, cathodes, and current collectors. Such stacked configurations can be difficult or uneconomical to manufacture, and powering an external device through an external circuit with stacked configurations requires the formation of numerous separate electrical connections. Moreover, problems with individual electrodes or cells (such as short circuits) in batteries containing multiple electrochemical cells with typical arrangements can lead to a propagation of failure or even thermal runaway from the initial problematic cell to other cells throughout the entire battery, which can rapidly deteriorate the performance of the battery and even create safety hazards. Additionally, in some cases, it may be desirable to maintain or change the temperature of the battery, as well as detect changes in temperature or pressure during operation of the battery.

Accordingly, improved articles, devices, systems, and methods are desirable.

SUMMARY

Articles containing electrodes and current collectors arranged such that at least one electrode can be electronically isolated from other components of the article and/or an electrochemical device, and associated devices, systems and methods, are provided. In some cases, the articles contain substrates for which a change in volume of the substrate causes at least one electrode to become electronically isolated from other components of the article and/or an electrochemical device. In certain cases, heating the substrate causes the change in volume of the substrate. The subject matter of the present invention involves, in some cases, interrelated products, alternative solutions to a particular problem, and/or a plurality of different uses of one or more systems and/or articles.

In one aspect, an article is provided. In some embodiments, the article comprises a substrate. In some cases, the article comprises a plurality of discrete electrode segments adjacent to the substrate. The electrode segments may comprise electrode active material. In some embodiments, the article comprises a current collector domain. The current collector domain may comprise a current collector bus electronically coupled to the discrete electrode segments. In some embodiments, the current collector domain comprises a plurality of current collector segments. Each current collector segment may be electronically coupled to an electrode segment. In some embodiments, for each of the current collector segments, the current collector segment is electronically coupled to the current collector bus via at least one current collector bridge.

In another aspect, an article is provided. In some embodiments, the article comprises a substrate. In some cases, the article comprises a plurality of discrete electrode segments adjacent to the substrate. The electrode segments may comprise electrode active material. In some embodiments, the article comprises a current collector domain. The current collector domain may comprise a current collector bus electronically coupled to the discrete electrode segments. In some embodiments, the article is configured such that when the temperature of the article reaches a threshold temperature, at least one of the electrode segments is no longer electronically coupled to the current collector bus due, at least in part, to a heat-induced change in volume of the substrate.

In another aspect, a method is provided. In some embodiments, the method comprises changing a volume of a substrate that is part of an electrochemical device during charging and/or discharging of the electrochemical device. In some cases, the electrochemical device comprises a substrate. In certain cases, the electrochemical device comprises a plurality of discrete electrode segments adjacent to the substrate. The electrode segments may comprise electrode active material. In some embodiments, the electrochemical device comprises a current collector domain comprising a current collector bus electronically coupled to the discrete electrode segments. In some embodiments, the changing the volume of the substrate induces, at least in part, a loss of electronic coupling between at least one of the electrode segments and the current collector bus.

In another aspect, an article is provided. In some embodiments, the article comprises a substrate. In some cases, the article comprises a plurality of discrete electrode segments adjacent to the substrate. The electrode segments may comprise electrode active material. In some embodiments, the article comprises a current collector domain. In some cases, the current collector domain comprises a current collector bus electronically coupled to the discrete electrode segments. In some embodiments, the article comprises a heater adjacent to the substrate. In certain cases, the heater is configured to heat at least a portion of the article.

In another aspect, an article is provided. In some embodiments, the article comprises a substrate. In some cases, the article comprises a plurality of discrete electrode segments adjacent to the substrate. The electrode segments may comprise electrode active material. In some embodiments, the article comprises a current collector domain. In some cases, the current collector domain comprises a current collector bus electronically coupled to the discrete electrode segments. In some embodiments, the article comprises one or more sensors adjacent to the substrate. In certain cases, the one or more sensors is configured to respond to a condition of the article.

In another aspect, a method is provided. In some embodiments, the method comprises heating at least a portion of an electrochemical device using a heater that is a part of the electrochemical device. In some cases, the electrochemical device comprises a substrate. In some embodiments, the electrochemical device comprises a plurality of discrete electrode segments adjacent to the substrate. The electrode segments may comprise electrode active material. In some embodiments, the electrochemical device comprises a current collector domain. In some cases, the current collector domain comprises a current collector bus electronically coupled to the discrete electrode segments.

In another aspect, a method is provided. In some embodiments, the method comprises detecting a condition of an electrochemical device based, at least in part, on a signal from a sensor that is a part of the electrochemical device. In some cases, the electrochemical device comprises a substrate. In some embodiments, the electrochemical device comprises a plurality of discrete electrode segments adjacent to the substrate. The electrode segments may comprise electrode active material. In some embodiments, the electrochemical device comprises a current collector domain. In some cases, the current collector domain comprises a current collector bus electronically coupled to the discrete electrode segments.

In another aspect, an electrochemical device is described. In some embodiments, the electrochemical device comprises a first anode portion comprising a first anode active surface portion. In some cases, the electrochemical device comprises a second anode portion comprising a second anode active surface portion, the second anode active surface portion facing the first anode active surface portion. In some embodiments, the electrochemical device comprises a third anode portion comprising a third anode active surface portion. In some cases, the third anode active surface portion is facing away from both the first anode active surface portion and the second anode active surface portion. In some embodiments, the electrochemical device comprises a fourth anode portion comprising a fourth anode active surface portion. In some cases, the fourth anode active surface portion is facing both the first anode active surface portion and the third anode active surface portion. In certain cases, the third anode portion is at least partially positioned between the first anode portion and the fourth anode portion. In some embodiments, the electrochemical device comprises a first cathode portion comprising a first cathode active surface portion facing the first anode active surface portion. In some embodiments, the electrochemical device comprises a second cathode portion comprising a second cathode active surface portion facing the second anode active surface portion. In some cases, the electrochemical device comprises a third cathode portion comprising a third cathode active surface portion facing the third anode active surface portion. In some cases, the electrochemical device comprises a fourth cathode portion comprising a fourth cathode active surface portion facing the fourth anode active surface portion. In some embodiments, the electrochemical device comprises a separator arranged such that a first portion of the separator is between the first anode portion and the first cathode portion, a second portion of the separator is between the second anode portion and the second cathode portion, a third portion of the separator is between the third anode portion and the third cathode portion, and a fourth portion of the separator is between the fourth anode portion and the fourth cathode portion. In some embodiments, the electrochemical device is constructed and arranged to apply, during at least one period of time during charge and/or discharge of the device, an anisotropic force with a component normal to the first anode active surface portion.

In another aspect, an electrochemical device is described. In some embodiments, the electrochemical device comprises a plurality of anode portions, a plurality of cathode portions, and a serpentine separator. In some embodiments, the electrochemical device comprises the following arranged in the order listed: a first anode portion comprising a first anode active surface portion; a first separator portion; a first cathode portion comprising a first cathode active surface portion; a second cathode portion comprising a second cathode active surface portion; a second separator portion; a second anode portion comprising a second anode active surface portion; a third anode portion comprising a third anode active surface portion; a third separator portion; a third cathode portion comprising a third cathode active surface portion; a fourth cathode portion comprising a fourth cathode active surface portion; a fourth separator portion; and a fourth anode portion comprising a fourth anode active surface portion. In some embodiments, the electrochemical device is constructed and arranged to apply, during at least one period of time during charge and/or discharge of the device, an anisotropic force with a component normal to the first anode active surface portion.

In another aspect, an electrochemical device is described. In some embodiments, the electrochemical device comprises a first anode portion comprising a first anode active surface portion. In some cases, the electrochemical device comprises a second anode portion comprising a second anode active surface portion, the second anode active surface portion facing the first anode active surface portion. In some embodiments, the electrochemical device comprises a third anode portion comprising a third anode active surface portion. In some cases, the third anode active surface portion is facing away from both the first anode active surface portion and the second anode active surface portion. In some embodiments, the electrochemical device comprises a fourth anode portion comprising a fourth anode active surface portion. In some cases, the fourth anode active surface portion is facing both the first anode active surface portion and the third anode active surface portion. In certain cases, the third anode portion is at least partially positioned between the first anode portion and the fourth anode portion. In some embodiments, the electrochemical device comprises a first cathode portion comprising a first cathode active surface portion facing the first anode active surface portion. In some embodiments, the electrochemical device comprises a second cathode portion comprising a second cathode active surface portion facing the second anode active surface portion. In some cases, the electrochemical device comprises a third cathode portion comprising a third cathode active surface portion facing the third anode active surface portion. In some cases, the electrochemical device comprises a fourth cathode portion comprising a fourth cathode active surface portion facing the fourth anode active surface portion. In some embodiments, the electrochemical device comprises a separator arranged such that a first portion of the separator is between the first anode portion and the first cathode portion, a second portion of the separator is between the second anode portion and the second cathode portion, a third portion of the separator is between the third anode portion and the third cathode portion, and a fourth portion of the separator is between the fourth anode portion and the fourth cathode portion. In some embodiments, the electrochemical device comprises a cumulative cathode active surface perimeter defined by the sum of the perimeters of all cathode active surfaces of the electrochemical device. In some cases, at least 60% of the cumulative cathode active surface perimeter is overlapped by anode active surface.

In another aspect, an electrochemical device is described. In some embodiments, the electrochemical device comprises a plurality of anode portions, a plurality of cathode portions, and a serpentine separator. In some embodiments, the electrochemical device comprises the following arranged in the order listed: a first anode portion comprising a first anode active surface portion; a first separator portion; a first cathode portion comprising a first cathode active surface portion; a second cathode portion comprising a second cathode active surface portion; a second separator portion; a second anode portion comprising a second anode active surface portion; a third anode portion comprising a third anode active surface portion; a third separator portion; a third cathode portion comprising a third cathode active surface portion; a fourth cathode portion comprising a fourth cathode active surface portion; a fourth separator portion; and a fourth anode portion comprising a fourth anode active surface portion. In some embodiments, the electrochemical device comprises a cumulative cathode active surface perimeter defined by the sum of the perimeters of all cathode active surfaces of the electrochemical device. In some cases, at least 60% of the cumulative cathode active surface perimeter is overlapped by anode active surface.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
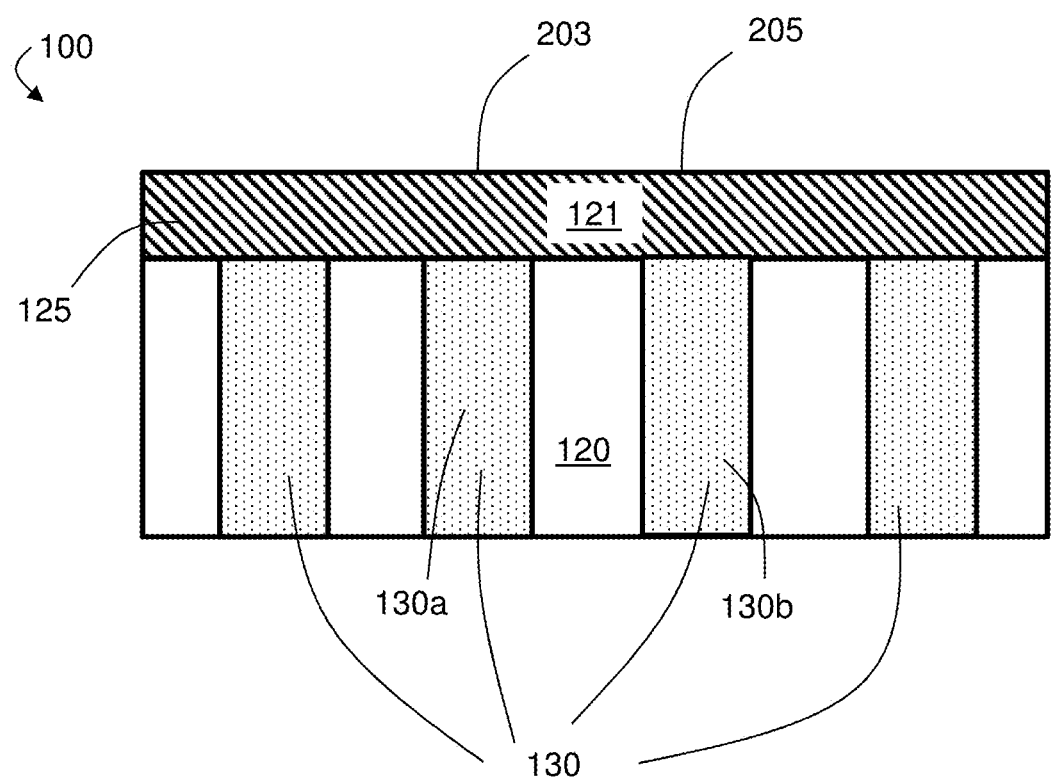
FIG. 1 is an exemplary schematic illustration depicting a top-down view of an article, according to certain embodiments.

Articles containing electrodes and current collectors arranged such that at least one electrode can be electronically isolated from other components of the article and/or an electrochemical device, and associated devices, systems and methods, are provided. In some cases, the article comprises a substrate (e.g., a polymeric material), a current collector bus, and a plurality of discrete electrode segments (e.g., comprising an electrode active material such as lithium and/or a lithium alloy) adjacent to the substrate and electronically coupled to the current collector bus. At least some of the electrode segments may be electronically decoupled from the current collector bus due at least in part to change in volume of the substrate. Changing the volume of the substrate may, in certain cases, involve heating the article (e.g., to cause a heat-induced expansion or contraction of the substrate), thereby providing a simple, economical way to electronically isolate electrodes (e.g., problematic electrodes such as those that are part of a short-circuit). Configurations of the article described herein may include the use of discrete current collector segments and current collector bridges electronically coupled to the current collector bus, and/or continuous components (e.g., continuous substrates and/or continuous current collector buses). The articles provided herein may be useful when included in electrochemical devices (e.g., a multi-cell battery such as a rechargeable lithium battery). The article may, in certain embodiments, comprise a heater and/or a sensor (e.g., a temperature sensor or a pressure sensor) adjacent to the substrate.

In certain cases, electrochemical devices (and articles contained therein) can be arranged with a folded configuration, and can be fabricated without the need for complicated and/or expensive manufacturing procedures. In some such cases, the folded (or foldable) electrochemical devices are constructed and arranged to apply (e.g., during at least one period of time during charge and/or discharge) an anisotropic force with a component normal a portion of the electrochemical device (e.g., an anode active surface portion). In certain cases, configurations of anodes and cathodes are employed to mitigate problems associated with certain anode active materials (e.g., lithium or lithium alloy). For example, in some cases, folded electrochemical devices comprising "oversized" anodes are provided.

A common problem for multi-cell batteries comprising a plurality of anodes and cathodes is the removal of problematic electrodes from the overall electrical circuit before the problematic electrodes cause substantial damage to the overall battery. One way in which an electrode may become problematic is when it reaches too high a temperature (e.g., due to the electrode participating in a short-circuit). Such problematic electrodes can compromise the performance of the battery and present safety hazards such as thermal runaway (e.g., in the case of lithium batteries). Electrochemical devices for which electrodes can be simply and easily electronically isolated (e.g., upon reaching a certain temperature) without complex and expensive circuitry, arrangements, and/or fabrication procedures are therefore desirable. The articles, systems, and methods described herein, in accordance with certain but not necessarily all embodiments, provide for simple, economical, and effective ways for electronically isolating electrodes from current collectors (e.g., current collector buses) and/or other components. For example, arranging an article with a current collector bus and a plurality of discrete electrode segments adjacent to a substrate allows, in some cases, for a change in volume of the substrate (e.g., a heat-induced change in volume of the substrate) to electronically decouple at least one of the discrete electrode segments from the current collector bus, therefore isolating the electrode segment from the system.

While typical batteries are constructed in a stacked configuration and therefore require careful, expensive, and often wasteful fabrication and arrangement steps, the articles and electrochemical devices described herein can, in certain cases, be arranged and constructed with certain continuous components such as continuous substrates, electrodes, current collectors, and/or separators. The use of some such continuous components may reduce the expense and manufacturing time for batteries and provide for configurations that can improve functionality. For example, a plurality of discrete electrodes can be electronically coupled to a continuous current collector bus, thereby providing a simple design for an article having electronically-isolatable electrodes. Additionally, a battery having continuous components can, in some cases, be arranged to be folded instead of stacked, which can accelerate fabrication, reduce cost, and increase tolerances. In some cases, an anisotropic force is applied to a folded electrochemical device described herein. Additionally, in some, but not all embodiments, the electrodes of the folded electrochemical device are arranged and configured such that a relatively high proportion of the cumulative perimeter of the cathode active surface is overlapped by anode, which may, in some cases, reduce certain problems such as over-utilization or uneven utilization during operation of the folded electrochemical device.

In some embodiments, articles, devices, systems, and methods related to the configuration of electrodes, substrates, current collectors, and related components are generally described. FIG. 1 includes a schematic illustration of article 100 according to one set of embodiments. The article may, in certain cases, be used as a component in an electrochemical device. The article may comprise multiple components, such as substrates, electrodes, and/or current collector domains in inventive configurations.

In some embodiments, the article comprises a substrate. Referring again to FIG. 1, in some embodiments, article 100 comprises substrate 120. In some embodiments, other components of the article, such electrodes, current collector domains, and the like may be disposed on the substrate. The substrate may be made of any of a variety of suitable materials, such as materials that can undergo a change in volume, as will be described in more detail below. In some embodiments, the substrate is a thin film (e.g., a thin polymeric film or a think ceramic film). The substrate may be a monolithic material, or the substrate may be a composite of multiple layers. In certain embodiments, the substrate comprises at least one domain or layer that is electronically non-conductive. In some, but not necessarily all embodiments, the substrate is flexible (e.g., has sufficient flexibility to be folded without undergoing substantial failure). In some, but not necessarily all embodiments, the substrate is or comprises a release layer. For example, substrate 120 in FIG. 1 is a release layer, in accordance with certain embodiments.

In some embodiments, the article comprises a plurality of discrete electrode segments adjacent to the substrate. As shown in FIG. 1, article 100 comprises a plurality of discrete electrode segments 130 adjacent to substrate 120. The electrode segments may be formed directly on the substrate (e.g., via a deposition or coating process), or there may be one or more intervening layers between the substrate and the adjacent electrode segments. The plurality of discrete electrode segments adjacent to the substrate may be within a relatively small distance of the substrate (e.g., in embodiments involving compact, energetically dense designs). For example, each of the plurality of discrete electrode segments may be within 5.0 mm, within 3.0 mm, within 2.0 mm, within 1.0 mm, within 0.5 mm, within 0.3 mm, within 0.2 mm, within 0.1 mm, or less of the substrate. In some embodiments, each of the plurality of discrete electrode segments are anodes, and in some embodiments each of the plurality of discrete electrode segments are cathodes. In certain embodiments, the plurality of discrete electrodes comprises both cathodes and anodes.

In some embodiments, the electrode segments comprise an electrode active material. As used herein, the term "electrode active material" refers to any electrochemically active species associated with an electrode. For example, a "cathode active material" refers to any electrochemically active species associated with the cathode, while an "anode active material" refers to any electrochemically active species associated with an anode. In some embodiments, the electrode segments comprise lithium metal and/or a lithium alloy as an electrode active material (e.g., as an anode active material). Suitable cathode active materials and anode active materials are described more fully below.

As used herein, the use of the term "discrete" in relation to the plurality discrete electrode segments mentioned above refers to each electrode segment of the plurality of discrete electrode segments being distinct and spatially separated from the other electrode segments of the plurality of discrete electrode segments. For example, referring to FIG. 1, the plurality of discrete electrode segments 130 comprises electrode segment 130*a* and electrode segment 130*b*, and electrode segment 130*a* is distinct and spatially separated from electrode segment 130*b*. In some embodiments, the discrete electrode segments are arranged such that the segments are not connected to each other via regions comprising electrode active material. In some cases, no two discrete electrode segments are in direct physical contact with each other when the article described herein is used as part of an electrochemical device (e.g., a device containing one or more electrochemical cells when loaded with electrolyte, such as a battery), even, for example, if and when the article is folded. Furthermore, any electronic coupling between any two discrete electrode segments involves the transport of electrons through at least one other component other than the coupled electrode segments, such as the current collector domain of the article. Having the article comprise a plurality of discrete electrode segments, as opposed to a plurality of non-discrete electrode segments, in accordance with certain embodiments, allows for individual electrode segments, in certain cases, to be electronically isolated from other components of the article, such as the other electrode segments and/or a current collector bus (described more fully below).

In some embodiments, the article comprises a current collector domain. For example, referring to FIG. 1, article 100 comprises current collector domain 125 adjacent to substrate 120, according to certain embodiments. The current collector domain can collect the electronic current generated by the plurality of discrete electrode segments, and can provide an efficient surface for attachment of electrical contacts leading to an external circuit (e.g., when the article is used as part of an electrochemical device such as a battery). As such, the current collector domain typically comprises an electronically conductive material. For example, the current collector domain may comprise one or more electronically conductive metals such as aluminum, copper, chromium, stainless steel, and nickel. In some embodiments, the current collector domain comprises a copper metal layer. In some instances, the current collector domain includes multiple subdomains or substructures, the arrangement and/or configuration of which may be useful in allowing for the electronic isolation of individual electrode segments of the plurality of discrete electrode segments (e.g., due to a change in volume of the substrate). For example, the current collector domain may comprise current collector segments and/or current collector bridges, as described more fully below.

In some embodiments, the current collector domain comprises a current collector bus. FIG. 1 depicts current collector domain 125, which comprises current collector bus 121, according to certain embodiments. In some cases, the current collector domain is made entirely of the current collector bus (as is the case shown in FIG. 1, according to certain embodiments), while in certain cases, the current collector domain includes other structures in addition to the current collector bus. The current collector bus may be the structure of the current collector domain to which electrical contact with an external circuit is formed (e.g., in the case of an electrochemical device such as a battery). In certain cases, the current collector bus is continuous, as is described in more detail below.

In some embodiments, the current collector bus is electronically coupled to the discrete electrode segments (e.g., from the plurality of discrete electrode segments). For example, referring to FIG. 1, article 100 comprises a plurality of discrete electrode segments 130 and current collector domain 125 comprising current collector bus 121, and current collector bus 121 is electronically coupled to the plurality of discrete electrode segments 130, according to certain embodiments. The electronic coupling between the discrete electrode segments and the current collector bus can allow for electrical current generated at the electrode segments to flow to the current collector bus, which may be in electronic contact with an external circuit. The electronic coupling may, in certain cases, be established by direct physical contact between the discrete electrode segments and the current collector bus. For example, referring to FIG. 1, the discrete electrode segments of the plurality of discrete electrode segments 130 are in direct physical contact with and consequently electronically coupled to current collector bus 121, in accordance with certain embodiments. However, in some cases, the electronic coupling between the discrete electrode segments and the current collector bus occurs via one or more additional intervening structures of the current collector domain, as will be described more fully below.

In some cases, a loss of electronic coupling between the current collector bus and at least one of the discrete electrode segments of the plurality of discrete electrode segments can occur. Such a loss of electronic coupling can result in the at least one of the discrete electrode segments being electronically isolated from the current collector bus, the other discrete electrode segments that have not lost electronic coupling with the current collector bus, and/or components of an external electrical circuit (e.g., other components of an electrochemical device such as a battery). As mentioned above, isolation of certain electrode segments can be useful for removing problematic electrodes from the overall circuit while allowing, for example, an electrochemical device to continue to charge and/or discharge with adequate performance.

Some embodiments comprise changing a volume of a substrate that is part of an electrochemical device during charging and/or discharging of the electrochemical device. The electrochemical device may comprise the article described herein, including the substrate described herein. In some cases, changing the volume of the substrate induces, at least in part, a loss of electronic coupling between at least one of the electrode segments and the current collector bus. For example, referring to FIG. 1 again, in some cases, changing the volume of substrate 120 of article 100 during charging and/or discharging of an electrochemical device comprising article 100 induces, at least in part, a loss of electronic coupling between discrete electrode segment 130a and current collector bus 121, according to certain embodiments. In such a way, the changing of the volume of the substrate can be used to electronically isolate certain discrete electrode segments during charging and/or discharge cycles (e.g., for safety reasons).

In some embodiments, changing the volume of the substrate comprises increasing the volume of the substrate. As an example and in accordance with certain embodiments, in FIG. 1, current collector bus 121 is a layer of conductive metal (e.g., copper) coated onto substrate 120, and the plurality of discrete electrode segments 130 comprises discrete layers comprising electrode active material (e.g., lithium and/or a lithium alloy) in direct physical contact with current collector bus 121. When the volume of substrate 120 is increased (e.g., expanded), at least one of the discrete electrode segments of the plurality of discrete electrode segments 130 (e.g., discrete electrode segment 130a), may lose electronic coupling with current collector bus 121 due, at least in part, to the increase in volume of the substrate (e.g., due to the formation of a gap and consequent loss of direct physical contact between at least one of the discrete electrode segments and current collector bus 121).

In some embodiments, changing the volume of the substrate comprises decreasing the volume of the substrate. As an example and in accordance with certain embodiments, in FIG. 1 current collector bus 121 is a layer of conductive metal (e.g., copper) coated onto substrate 120, and the plurality of discrete electrode segments 130 comprises discrete layers comprising electrode active material (e.g., lithium and/or a lithium alloy) in direct physical contact with current collector bus 121. When the volume of substrate 120 is decreased (e.g., contracted/shrunk), at least one of the discrete electrode segments of the plurality of discrete electrode segments 130 (e.g., discrete electrode segment 130a), may lose electronic coupling with current collector bus 121 due, at least in part, to the decrease in volume of the substrate (e.g., due to delamination of the at least one of the discrete electrode segments and a consequent loss of direct physical contact between the at least one of the discrete electrode segments and current collector bus 121).

In some cases, changing the volume of the substrate comprises heating the substrate. In other words, a change in volume of the substrate may occur due, at least in part, to a thermal expansion or contraction of the substrate. For example, referring to FIG. 1, heating substrate 120 (or a portion thereof) may cause a change in volume of substrate 120. In certain cases, heating the substrate may comprise applying heat from a heater, which can either be a component external to the article or component integrated into the article, as described more fully below. However, in some embodiments, heating the substrate comprises charging and/or discharging an electrochemical device such that heat is generated by the charging and/or discharging. For example, in some cases, a short circuit between at least one of the discrete electrode segments and another component of an electrochemical device may occur, resulting in a resistive heating that heats and consequently changes the volume of the substrate.

It should be understood that in some cases, heating components of an electrochemical device or an article described herein may cause a loss of electronic coupling between a discrete electrode segment and the current collector bus due to melting or thermal shock of a component (e.g., a portion of the discrete electrode segment or a portion of the current collector bus). While such a phenomenon may occur in some cases during the heating of the substrate, embodiments described herein involve the loss of electronic coupling occurring at least in part due to a change in volume of the substrate. Non-limiting causes of the loss of electronic coupling due to the change in the volume of the substrate are described in more detail below.

In some embodiments, the article described herein is configured such that, when the temperature of the article reaches a threshold temperature, at least one of the electrode segments is no longer electronically coupled to the current collector bus due, at least in part, to a heat-induced change in volume of the substrate. For example, referring to FIG. 1, article 100 is configured such that, when article 100 reaches a threshold temperature, at least one of the electrode segments of the plurality of discrete electrode segments 130 (e.g., discrete electrode segment 130a) is no longer electronically coupled to current collector bus 121, due, at least in part, to a heat induced change in volume of the substrate, according to some embodiments. As a non-limiting example, in some cases, the threshold temperature is 65° C. In such cases, if the temperature of the article rises (e.g., due to an external heat source and/or a short-circuiting of an electrochemical device), once the temperature reaches 65° C., at least one of the electrode segments will become electronically decoupled from the current collector bus due, at least in part, to a heat-induced change in volume of the substrate.

The article may be configured to undergo a loss of electronic coupling between at least one of the discrete electrode segments and the current collector bus due, at least in part, to a heat-induced change in volume of the substrate by, for example choosing certain components, such as the substrate, to comprise one or more materials having a thermal expansion coefficient with a relatively large magnitude. In addition or alternatively, the article can be configured to have a mismatch between the thermal expansion coefficients of two or more components of the article (e.g., the substrate and one or more structures of the current collector domain), so that the two or more components expand at different rates during the heating process, causing mechanical failure of a component and therefore loss of electronic coupling. One exemplary configuration of an article that may, in some embodiments, undergo a loss of electronic coupling between at least one of the electrode segments and the current collector domain when the temperature of the article reaches a threshold temperature is described in more detail below.

It should be understood that the threshold temperature at which, in some embodiments, a loss of electronic coupling between the discrete electrode segments and the current collector domain occurs depends on the materials used for the components of the article (e.g., the substrate, the electrode segments, the current collector domain, etc.), as well as the geometry and dimensions of the components. The threshold temperature is an absolute temperature at which the loss of electronic coupling described herein and elsewhere occurs. It should be understood that the threshold temperature considered herein refers to the temperature of one or more of the components of the article, not an ambient temperature (e.g., the temperature of the surroundings or environment in which the article and/or electrochemical device comprising the article is located). In some embodiments, the threshold temperature is a temperature of the substrate of the article. In some embodiments, the threshold temperature is a temperature of the current collector domain. In some embodiments, the threshold temperature is a temperature of at least one of the plurality of discrete electrode segments.

In some embodiments, the article is configured such that, upon undergoing a threshold temperature change, at least one of the electrode segments is no longer electronically coupled to the current collector bus due, at least in part, to a heat-induced change in volume of the substrate. The threshold temperature change is relative to a certain initial temperature at which there are no internal mechanical stresses (e.g., compression, tension, shear, bending, torsion, etc.) in the article.

As mentioned above, in certain cases, the current collector domain comprises multiple substructures that may be useful in electronically isolating one or more discrete electrode segments under certain conditions (e.g., upon a heat-induced change in volume of the substrate).

Figure 2A:
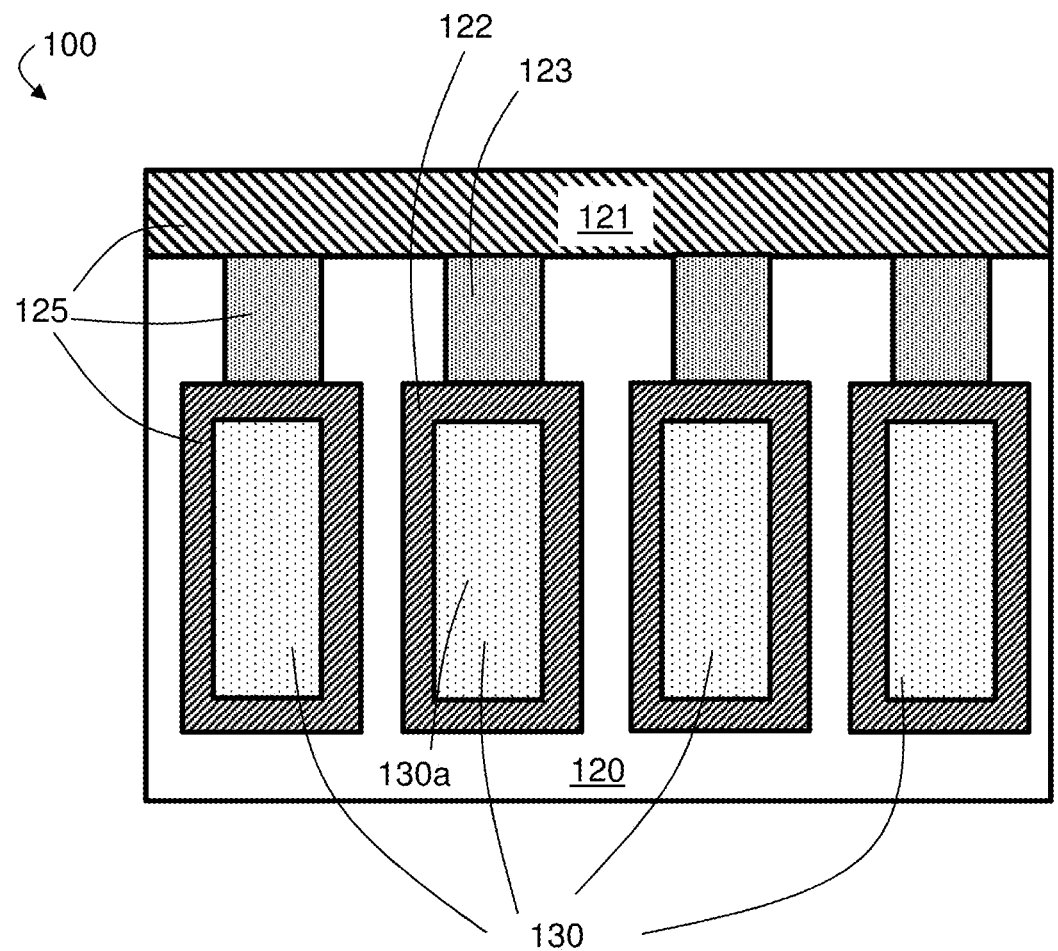
FIG. 2A is an exemplary schematic illustration depicting a top-down view of an article, according to certain embodiments.

In some embodiments, the current collector domain comprises a plurality of current collector segments. For example, FIG. 2A depicts article 100 comprising current collector domain 125, wherein current collector domain 125 comprises a plurality of current collectors segments, including current collector segment 122, in addition to current collector bus 121. As in the case of other structures of the current collector domain, the current collector segments comprise and/or are made of electronically conductive materials, such as electronically conductive metals (e.g., copper). The current collector segments can be made, for example, by performing a patterned deposition of the electronically conductive material (e.g., as films) on to the substrate (e.g., a release layer), as is described below. In some embodiments, the current collector segments are separated by voids or gaps. For example, in FIG. 2A, current collector segment 122 is separated from the closest neighboring current collector segment by a void in conductive material (in some cases, the void leaving a portion of substrate 120 exposed). The presence of voids or gaps between current collector segments allows for the current collector segments to be electronically isolated from each other, under certain conditions (e.g., upon a heat-induced change in volume of the substrate).

In some embodiments, each current collector segment is electronically coupled to an electrode segment. Referring again to FIG. 2A, article 100 comprises a plurality of discrete electrode segments 130 including discrete electrode segment 130*a*, as well as a plurality of current collector segments including current collector segment 122, and current collector segment 122 is electronically coupled to discrete electrode segment 130*a*. The electronic coupling between a current collector segment and an electrode segment can allow for electrical current generated at the electrode segment to flow to the current collector segment, which may electronically couple with other components of the current collector domain, such as the current collector bus.

Figure 2B:
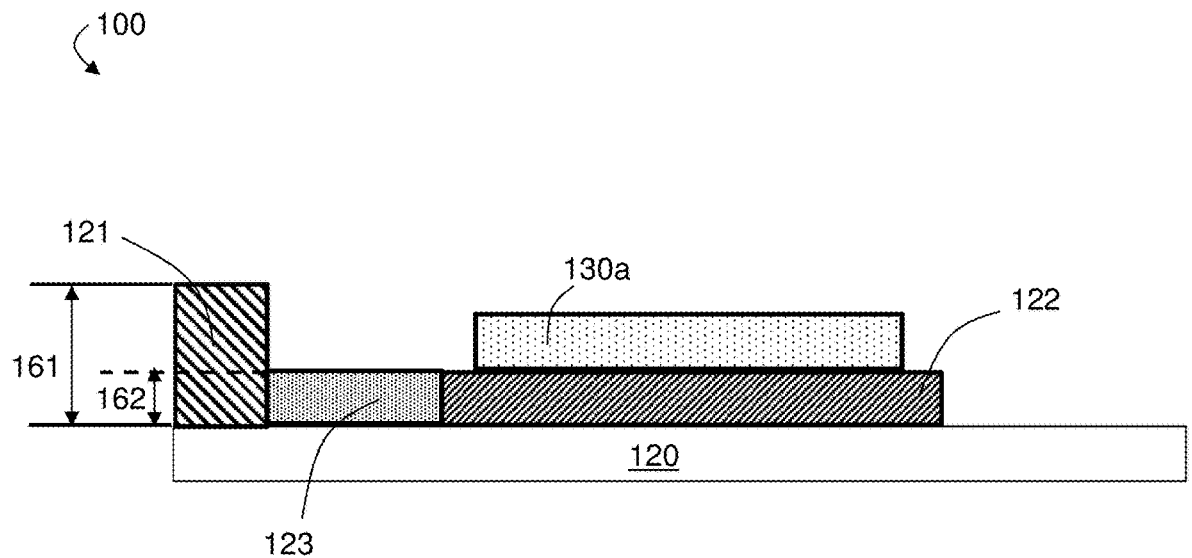
FIG. 2B is an exemplary schematic illustration depicting a cross-sectional side view of an article, according to certain embodiments.

In some embodiments, for each current collector segment, the current collector segment is disposed, at least partially, between the substrate and the electrode segment to which the current collector segment is electronically coupled. FIG. 2B depicts a side view of exemplary article 100, where current collector segment 122 is disposed, at least partially, between electrode segment 130*a* and substrate 120. Such a configuration can allow for a relatively large area of contact between the electrode segment and the current collector segment, while still leaving a relatively large active surface of the electrode segment facing away from the current collector segment available for use in applications such as in an electrochemical device. As used herein, the term "active surface" is used to describe a surface of an electrode that can be in physical contact with an electrolyte when the article is part of an electrochemical cell, and at which electrochemical reactions may take place. Having a relatively large area of contact between the electrode segment and the current collector segment can allow for efficient transfer of electrical current generated at the electrode segment to the current collector domain.

In some embodiments, for each of the current collector segments, the current collector segment is electronically coupled to the current collector bus via at least one current collector bridge. In other words, in some embodiments, any flow path of electrical current from the current collector segments to the current collector bus must pass through at least one current collector bridge. A current collector bridge is a substructure of the current collector domain disposed, at least partially, between a current collector segment and the current collector bus. FIG. 2A depicts a plurality of current collector bridges, including current collector bridge 123. Current collector bridge 123 is disposed between current collector segment 122 and current collector bus 121. FIG. 2B shows a side view of a cross-section of exemplary article 100, for which current collector bridge 123 is disposed between current collector segment 122 and current collector bus 121. Current collector segment 122 is electronically coupled to current collector bus 121 via current collector bridge 123, according to certain embodiments. The current collector bridges may comprise an electronically conductive material (e.g., an electronically conductive metal such as copper). As in the case of the current collector segments, the current collector bridges can be made, for example, by performing a patterned deposition of the electrically conductive material (e.g., as films) on to the substrate (e.g., a release layer). In some cases, the current collector bridges have a relatively small thickness, as will be described more below. In some cases, each current collector bridge is in direct physical contact with an associated current collector segment as well as the current collector bridge. However, in certain embodiments, other intervening materials (e.g., electronically conductive materials) or structures may be disposed, at least partially, between the current collector bridge and the associated current collector segment and/or current collector bus.

In some embodiments, for each discrete electrode segment of the plurality of discrete electrode segments, the discrete electrode segment is electronically coupled to the current collector bus via at least one current collector segment. In other words, in certain embodiments, any flow path of electrical current generated at a discrete electrode segment of the plurality of discrete electrode segments to the current collector bus must pass through at least one current collector segment. For example, referring again to FIGS. 2A and 2B, any flow path of electrical current generated at discrete electrode segment 130*a* (e.g., during discharging of an electrochemical cell) to current collector bus 121 must pass through current collector segment 122, according to certain embodiments. In some cases, the article is configured such that any flow path of electrical current generated at a discrete electrode segment to the current collector bus must pass through both at least one current collector segment associated with the discrete electrode as well and a current collector bridge that electronically couples the current collector segment to the current collector bus. For example, referring to FIGS. 2A and 2B, any flow of electrical current generated at discrete electrode segment 130*a* to current collector bus 121 must comprise transporting electronic charge from discrete electrode segment 130*a* to current collector segment 122, transporting electronic charge from current collector segment 122 to current collector bridge 123, and finally, transporting electronic charge from current collector bridge 123 to current collector bus 121, according to certain embodiments. Some such configurations of the article described herein, involving discrete electrode segments, current collector segments, and a current collector bridges, each of which is electronically coupled to the current collector bus but separated, for example, by voids or gaps), may allow for convenient electronic isolation of individual discrete electrode segments (e.g., caused by changing the volume of the substrate and consequently breaking a current collector bridge associated with that discrete electrode segment).

In some embodiments, changing the volume of the substrate causes, at least in part, at least one of the current collector bridges to no longer couple the current collector segment associated with that current collector bridge to the current collector bus. Such a loss of electronic coupling between a current collector segment and the current collector bus may result in the loss of coupling between the discrete electrode segment associated with the current collector segment and the current collector bus, thereby electronically isolating the electrode segment. For example, referring to FIG. 2A, changing the volume of substrate 120 causes, at least in part, current collector bridge 123 to no longer couple current collector segment 122 to current collector bus 121, thereby electronically isolating discrete electrode segment 130*a*. A change in volume of the substrate may cause a current collector bridge to no longer couple a current collector segment to the current collector bus by causing, for example, mechanical failure of the current collector bridge (e.g., fracturing caused by ultimate tensile or compressive failure of the current collector bridge) or a physical separation of the current collector bridge from one or both of the current collector segment and the current collector bus (e.g., via delamination).

As mentioned above, in some cases, changing the volume of the substrate involves heating the substrate (e.g., heating the substrate such that it reaches a threshold temperature during charging and/or discharging of an electrochemical device comprising the article comprising the substrate). In some embodiments, a heat-induced change in volume of the substrate is an increase in volume of the substrate. For example, in some embodiments, the substrate has a positive thermal expansion coefficient (e.g., at the threshold temperature), and heating the substrate causes a thermal expansion of the substrate. For example, in some embodiments, substrate 120 comprises a material having a positive thermal expansion coefficient, and heating substrate 120 causes an increase in volume of substrate 120. However, in some embodiments, a heat-induced change in volume of the substrate is a decrease in the volume of the substrate. For example, in some cases the substrate has a negative thermal expansion coefficient at the threshold temperature. For example, according to certain embodiments, substrate 120 comprises a material having a negative thermal expansion coefficient (e.g., at a threshold temperature), and heating substrate 120 causes a decrease in volume of substrate 120. In certain cases, the substrate comprises a heat-shrinkable film. In some cases, the substrate comprises a polymeric material such as polyvinyl alcohol.

In some embodiments, the article is configured such that, when the temperature of the article reaches a threshold temperature, at least one of the current collector bridges no longer couples the current collector segment associated with that current collector bridge to the current collector bus due, at least in part, to a heat-induced change in volume of the substrate. Referring to FIG. 2A, when article 100 reaches a certain threshold temperature, current collector bridge 123 no longer electronically couples the current collector segment 122 to current collector bus 121. Such a configuration may be useful in electronically isolating the discrete electrode segment. For example, in some embodiments, the article is configured such that, when the temperature of the article reaches a threshold temperature, at least one of the discrete electrode segments is no longer electronically coupled to the current collector bus due, at least in part, to a heat-induced change in volume of the substrate. Referring to FIG. 2B, in certain embodiments, electrode segment 130*a* is electronically coupled to current collector bus 121 via current collector segment 122 and current collector bridge 123. In certain cases, when article 100 reaches (e.g., is heated to) a threshold temperature and current collector bridge 123 no longer electronically couples the current collector segment 122 to current collector bus 121, no electronically conductive path exists for current generated at discrete electrode 130*a* to reach current collector bus 121, thereby electronically isolating discrete electrode segment 130*a*.

In some embodiments, the article is configured such that the threshold temperature referred to herein falls within a certain range of temperatures. For example, the article may be configured such that the threshold temperature is high enough that a loss of electronic coupling between the discrete electrode segment and the current collector bus (e.g., due to a change in volume of the substrate) does not occur during normal operation of an electrochemical device comprising the article (e.g., normal charging and/or discharging without short-circuiting or thermal runaway occurring). As such, the article may be configured in certain embodiments such that the threshold temperature of the article is greater than or equal to 50° C., greater than or equal to 55° C., greater than or equal to 60° C., greater than or equal to 70° C., greater than or equal to 75° C., greater than or equal to 80° C., greater than or equal to 85° C., greater than or equal to 90° C., greater than or equal to 90° C., greater than or equal to 95° C., greater than or equal to 100° C., or more. It should be understood that a threshold temperature of an article falling within a certain range of temperatures means that the specific temperature at which the article is configured, upon a heat-induced change in volume of the substrate, to undergo at least one electronic decoupling as described herein (e.g., between at least one discrete electrode segment and the current collector bus, between at least one discrete current collector segment and the current collector bus) falls within that range. An article configured to have a threshold temperature of 65° C. (e.g., an article that, when heated, will undergo at least one electronic decoupling as described herein once the temperature of the article reaches 65° C. due at least in part to a change in volume of the substrate) is one example of an article for which the threshold temperature is greater than or equal to 50° C., because 65° C. falls within the range of values greater than or equal to 50° C.

In some embodiments, the article may be configured such that the threshold temperature is low enough that the loss of electronic coupling between the discrete electrode segment and the current collector bus occurs at a low enough temperature that significant damage to the article and/or an electrochemical device comprising the article does not occur prior to the loss of coupling. As such, the article may be configured in certain embodiments such that the threshold temperature of the article is less than or equal to 150° C., less than or equal to 145° C., less than or equal to 140° C., less than or equal to 130° C., less than or equal to 120° C., or less. As another non-limiting example, an article configured to have a threshold temperature of 110° C. (e.g., an article that, when heated, will undergo at least one electronic decoupling as described herein once the temperature of the article reaches 110° C. due at least in part to a change in volume of the substrate) is an article for which the threshold temperature is less than or equal to 120° C., because 110° C. falls within the range of values less than or equal to 120° C.

The threshold temperature for an article described herein may be measured, for example, by running a test current between the discrete electrode segments and the current collector bus while ramping the temperature of the article (or a component thereof). The threshold temperature would be determined by recording the temperature when a loss of electronic coupling (e.g., an interruption in the test current) between at least one of the discrete electrode segments and the current collector bus is observed.

One way in which the article may be configured to have at least one of the current collector bridges no longer couple the current collector segment associated with that current collector bridge to the current collector bus when the temperature of the article reaches a threshold temperature is by selecting materials for the current collector bridge and the substrate that have different thermal expansion coefficients. Thermal expansion coefficients can be expressed in terms of linear thermal expansion coefficients (relating to fractional changes in the length of the material in response to a change in temperature), areal thermal expansion coefficients (relating to fractional changes in the area of the material in response to a change in temperature), and/or volumetric thermal expansion coefficients (relating to fractional changes in the volume of the material in response to a change in temperature). Unless otherwise stated, thermal expansion coefficients referred to herein correspond to linear thermal expansion coefficients. In such a way, during a heating process, the volume of the substrate may expand (or contract) to a different degree than the current collector bridge due to the differing thermal expansion coefficients, leading to a source of mechanical stress that could lead to a mechanical failure (e.g., fracturing or delamination) that results in a loss of electronic coupling between the current collector segment and the current collector bridge.

In some embodiments, the article is configured such that, when the temperature of the article reaches a threshold temperature, at least one of the current collector bridges undergoes ultimate tensile failure. Ultimate tensile failure of a material refers to a breaking (e.g., fracturing) of the material due to the material experiencing tension. One non-limiting example of such configuration is that in which the thermal expansion coefficient of the substrate is greater than the thermal expansion coefficient of the at least one current collector bridge. For example, referring to FIG. 2A, substrate 120 may be made out of a material having a greater thermal expansion coefficient than that of the material that current collector bridge 123 is made out of, and current collector bridge 123 may be attached to substrate 120 (e.g., attached directly or via an intervening adhesive layer or domain), according to certain embodiments. When substrate 120 and current collector bridge 123 are heated (e.g., via a thermal load), substrate 120 will expand to a greater degree than does current collector bridge 123, resulting in current collector bridge 123 experiencing a tensile force that depends on the degree of expansion of substrate 120. In some cases, substrate 120 may expand to such a degree that the tensile force applied to current collector bridge 123 is sufficient to cause ultimate tensile failure of current collector bridge 123. Without wishing to be bound by any particular theory, other design factors that may be used to control the likelihood of a current collector bridge undergoing mechanical failure such as ultimate tensile failure upon a certain change in volume of the substrate include, but are not limited to, the thickness of the current collector bridge, the elastic modulus of the current collector bridge, and/or the area of the current collector bridge.

Figure 3:
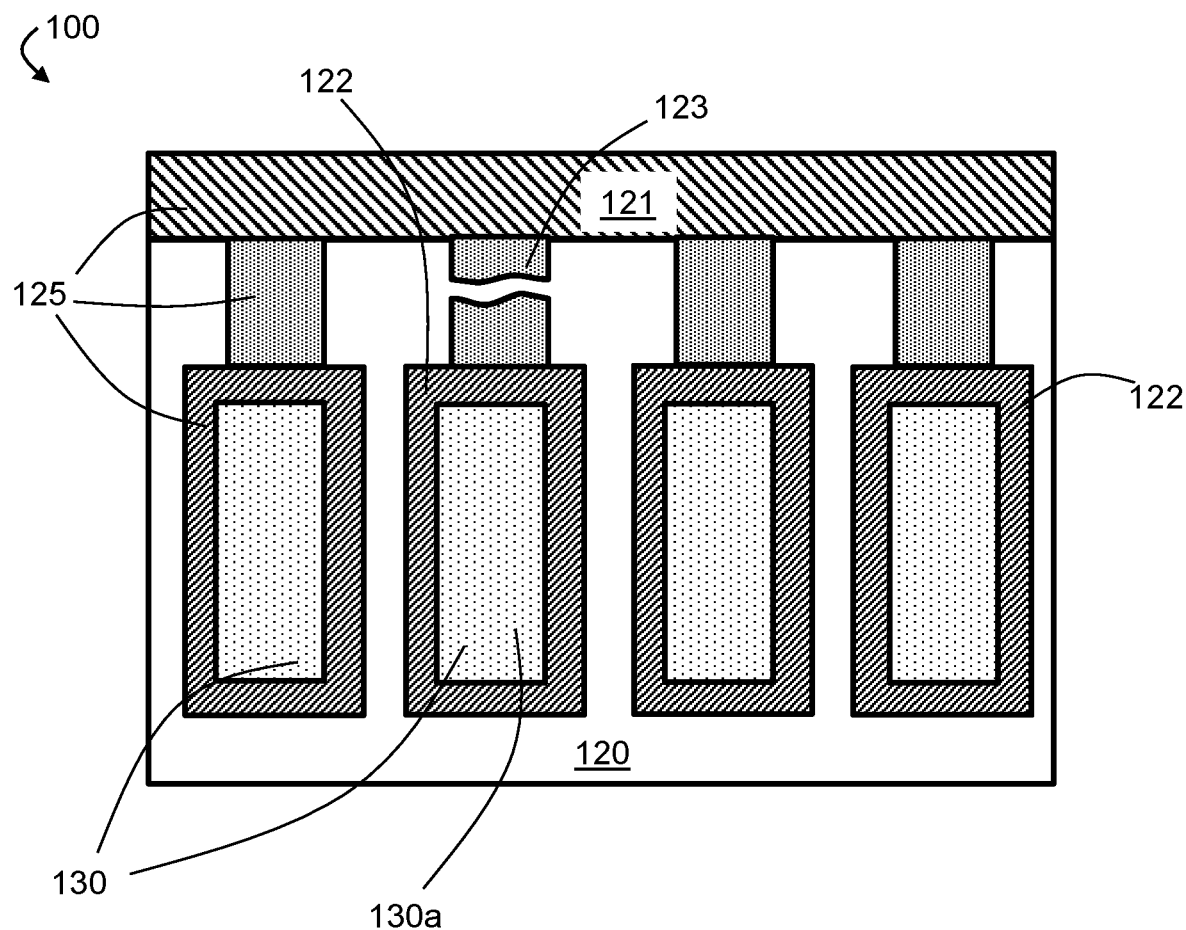
FIG. 3 is an exemplary schematic illustration depicting a top-down view an article, according to certain embodiments.

In some embodiments, at least one of the current collector bridges undergoes ultimate tensile failure in such a way that the current collector bridge no longer electronically couples the current collector segment associated with that current collector bridge to the current collector bus due, at least in part, to a heat-induced change in volume of the substrate. FIG. 3 depicts a top down view of one example of article 100 following ultimate tensile failure of current collector bridge 123 caused, at least in part, by a heat-induced change in volume of the substrate, as described above, according to certain embodiments. As can be seen in FIG. 3, the ultimate tensile failure of current collector bridge 123 results in a fracture that leads to a complete discontinuity in current collector bridge 123, thereby disrupting electronic coupling between the collector segment 122 and current collector bus 121, and consequently disrupting electronic coupling between discrete electrode segment 130*a* and current collector bus 121.

In some embodiments, the article is configured such that, once the temperature of the article reaches a threshold temperature, at least one of the current collector bridges undergoes ultimate compressive failure (e.g., ultimate linear compressive failure). Ultimate compressive failure of a material refers to a breaking (e.g., fracturing or buckling) of the material due to the material experiencing compression. One non-limiting example of such configuration is that in which the thermal expansion coefficient of the substrate is less than the thermal expansion coefficient of the at least one current collector bridge. Another non-limiting example of such configuration is that in which the thermal expansion coefficient of the substrate is negative (e.g., the substrate is a heat-shrinkable film). In some embodiments, the at least one of the current collector bridges undergoes ultimate compressive failure in such a way that the at least one of the current collector bridges no longer electronically couples the current collector segment associated with that current collector bridge to the current collector bus due, at least in part, to a heat-induced change in volume of the substrate.

In some embodiments, a first component of the article (e.g., a current collector bridge) and a second component of the article (e.g., the substrate) in direct contact and attached to the first component are configured such that the first component and second component have a certain thermal expansion differential. The thermal expansion differential, as used herein, is expressed as:

$$\frac{\frac{A_1}{A_2}\sigma_{ult,1} + \frac{\sigma_{ult,1}}{E_1}}{\alpha_2 - \alpha_1}$$

where $A_1$ is the area of the first component, $A_2$ is the area of the second component, $\alpha_1$ is the linear expansion coefficient of the first component, $\alpha_2$ is the linear expansion coefficient of the second component, $E_1$ is the modulus of elasticity of the first component, $E_2$ is the modulus of elasticity of the second component, and $\sigma_{ult,1}$ is the ultimate tensile strength of the first component. The thermal expansion differential depends on the materials selected for the first component and/or the second component, as well as the respective areas of the first component and the second component. In some, but not necessarily all embodiments, a temperature change, $\Delta T$, of the first component of the article and/or a second component results in ultimate tensile failure of the first component if the temperature change is greater than or equal to the thermal expansion differential. In other words, in some embodiments, the first component of the article fails in tension (in some cases leading to a loss of electronic coupling between certain components of the article) if the inequality expressed in Eq. 1 is met:

$$\Delta T \geq \frac{\frac{A_1}{A_2}\sigma_{ult,1} + \frac{\sigma_{ult,1}}{E_1}}{\alpha_2 - \alpha_1} \quad (1)$$

In embodiments in which Eq. 1 is satisfied, a change in temperature of $\Delta T$ will lead to ultimate tensile failure of the first component (e.g., a current collector bridge) if $\alpha_2$ is greater than $\alpha_1$. In some embodiments, Eq. 1 may be used to determine the temperature change necessary to cause ultimate tensile failure of the first component if the geometry and materials selected for the first component and second component are known.

In some embodiments, the first component (e.g., at least one current collector bridge) and/or the second component (e.g., the substrate) have a thermal expansion differential of greater than or equal to 10° C., greater than or equal to 15° C., greater than or equal to 20° C., greater than or equal to 25° C., greater than or equal to 30° C., greater than or equal to 40° C., or more. In some embodiments, the first component (e.g., at least one current collector bridge) and/or the second component (e.g., the substrate) have a thermal expansion differential of less than or equal to 100° C., less than or equal to 90° C., less than or equal to 80° C., less than or equal to 70° C., less than or equal to 60° C., or less. Combinations of the above ranges are possible. For example, in some embodiments, the first component (e.g., at least one current collector bridge) and/or the second component (e.g., the substrate) have a thermal expansion differential of greater than or equal to 10° C. and less than or equal to 100° C.

In some embodiments, the article is configured such that, when the temperature of the article reaches a threshold temperature, at least one of the current collector bridges undergoes a change other than ultimate tensile failure or ultimate compressive failure such that the at least one of the current collector bridges no longer electronically couples the current collector segment associated with that current collector bridge to the current collector bus due, at least in part, to a heat-induced change in volume of the substrate. For example, in some cases, the change in volume of the substrate causes a delamination of the current collector bridge such that it loses contact with at least one of either the current collector segment to which the current collector bridge is associated or the current collector bus.

In some embodiments, the heating of the article described herein (resulting in a heat-induced change in volume of the substrate) occurs passively. Heating of the article occurs passively if it occurs in the absence of the application of a thermal load from a heater described herein. For example the article may be heated passively due to a fault in an electrochemical device that comprises the article during charging and/or discharging of the electrochemical device, such as when short-circuiting and/or thermal runaway occur (e.g., due to corrosion or fatigue of one or more parts of the electrochemical device). Such processes may cause heating of one or more components of the article due to resistive heating and/or the release of heat from exothermic chemical reactions, in some cases raising the temperature above the threshold temperature.

In some embodiments, at least a portion of the heat-induced change in volume of the substrate occurs due to an active heating process. An active heating process involves the application of a thermal load from a heater. As used herein, a heater is a component that can receive a signal (e.g., an electrical signal) that actuates the heater and causes it to apply a thermal load. In some cases, heating the substrate is accomplished, at least in part, via the use of a heater that is part of the electrochemical device. In some embodiments, a heater is an external component adjacent to the article. However, in certain embodiments, the heater is a component integrated into the article (e.g., as a resistive heater applied as a thin film to one or more layers of the article). In some cases, if the substrate comprises a material with a sufficient electronic conductivity, the substrate itself can serve as a heater.

Figure 7A:
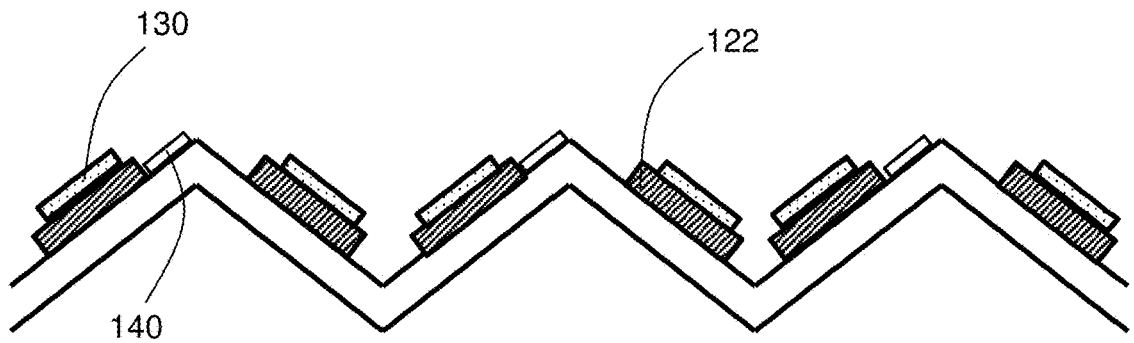
FIG. 7A is an exemplary schematic illustration depicting a side view of a part of an article, according to certain embodiments.
Figure 7B:
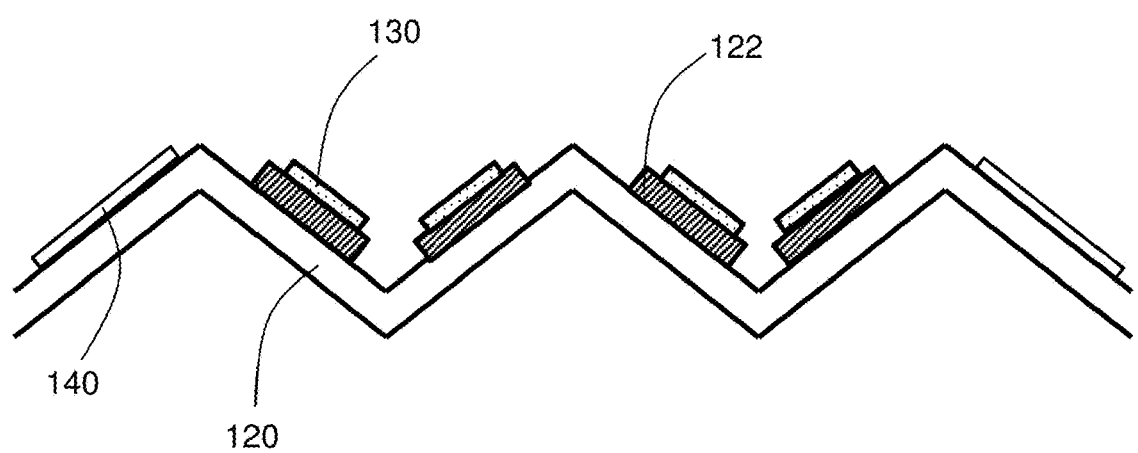
FIG. 7B is an exemplary schematic illustration depicting a side view of a part of an article, according to certain embodiments.

In some embodiments, the article comprises a heater adjacent to the substrate. In certain cases, the article comprises multiple heaters adjacent to the substrate. As mentioned above, the heater may be configured to heat at least a portion of the article described herein. For example, FIG. 7A shows exemplary article 100 comprising heater 140 adjacent to substrate 120, and, in some cases, heater 140 is capable of heating article 100. It may be useful, in accordance with certain but not necessarily all embodiments, to include a heater in an article described herein for a variety of reasons. For example, the heater may be used to heat the substrate such that a heat-induced change in volume of the substrate occurs, resulting in a loss of electronic coupling between one or more discrete electrode segments and the current collector bus, as described above in relation to active heating of the article. In certain cases, including a heater adjacent to the article (e.g., the substrate) can provide a way to maintain a temperature of the article within a desired range, such as in cases in which the article is part of an electrochemical device that may be desired to operate in low-temperature ambient conditions (e.g., a battery for of electric-powered vehicle operating during winter). It should be understood that while, in some cases, the heater is immediately adjacent to the substrate (e.g., attached, coated, or vacuum deposited directly on to the substrate with no intervening layers or structures between the heater and the substrate, as is illustrated in FIG. 7A and FIG. 7B), in certain cases, the heater is disposed directly on or more components (e.g., layers) of the article that are not the substrate. FIG. 7A shows a plurality of heaters 140, each next to (but not in direct contact with) a discrete electrode segment and/or a discrete current collector segment, in accordance with certain embodiments. In some embodiments, the distance between the heater and the substrate is less than or equal to 5 mm, less than or equal to 3 mm, less than or equal to 2 mm, less than or equal to 1 mm, less than or equal to 0.5 mm, less than or equal to 0.2 mm, less than or equal to 0.1 mm, or less.

In some cases, the heater replaces (i.e., "takes the place of") one or more discrete electrode segments and/or components of the current collector domain in the article structure. For example, in cases in which discrete current collector segments are deposited at periodic locations along the substrate during fabrication (e.g., via a skip coating process), one or more of the locations may be masked such that a current collector segment is not deposited there, and, at a later step, a heater is placed at that one or more locations (e.g., following an unmasking step).

In some embodiments, the heater is located near one or more of the ends of the article. For example, in some cases, the heater is located within the final 20%, within the final 10%, or within the final 5% of the length of the article. In some, but not necessarily all cases, no discrete electrode segments or current collector segments are located between the heater and an end of the substrate (referring to the ends according to a long axis of the substrate). For example, FIG. 7B shows a non-limiting embodiment in which heater 140 is positioned near the end of article 100, as opposed to an interior location such as is shown in the illustration of FIG. 7A. Placing the heater at or near one of the ends of the article may assist with ease of fabrication (e.g., by potentially avoiding complicated masking steps) and allow for easy access to the heater even when the article is folded, in accordance with certain, but not necessarily all embodiments. However, in certain cases, placing the heater in an interior location, such as is shown in FIG. 7A, may be useful in providing more uniform heat throughout the article, such as in cases in which the article is folded, as well as allowing for localized heating (e.g., near regions of the substrate near particular current collector bridges in accordance with certain, but not necessarily all embodiments). As mentioned above in described in more detail below, in some cases, the article is foldable. In some such cases, the heater is positioned between folded sections of the article when the article is folded. Such a configuration may, in certain embodiments, allow for the heater to easily heat interior portions (e.g., folds) of the article and/or a folded electrochemical device comprising the article.

In some embodiments, the heater comprises a thin film. In certain, but not necessarily all cases, the heater is a thin film. For example, referring to FIG. 7A, heater 140 is a thin film, in accordance with certain embodiments. In embodiments in which the heater is or comprises a thin film, the thin film may be deposited (e.g., by physical or chemical vacuum deposition techniques, spin coating, or other suitable thin film deposition techniques described herein) on to a portion of the article. For example, in some cases, the heater is a thin film deposited directly on to the substrate (e.g., during the manufacturing of the substrate). In certain cases however, the thin film of the heater is deposited on to one or more other components of the article. In certain cases, a plurality of heaters comprising thin films are positioned on the article as a plurality of discrete thin film segments (e.g., thin film segments deposited via skip coating or coating with a mask). The use of heaters comprising thin films may be beneficial in cases in which a relatively high volumetric energy density of a battery comprising the article is desired, in accordance with some, but not necessarily all embodiments. Additionally, thin film heaters may be useful in integrating the heater into an article that is foldable, because the thin films may be thin enough to avoid obstructing the folding of the article, according to certain embodiments. In some cases, the thickness (e.g., average thickness) of the heater (e.g., a thin film heater) is less than or equal to 1 mm, less than or equal to 500 µm, less than or equal to 200 µm, less or equal to 100 µm, less than or equal to 50 µm, less than or equal to 20 µm, less than or equal to 10 µm, less than or equal to 5 µm, less than or equal to 2 µm, less than or equal to 1 µm, less than or equal to 0.5 µm, less than or equal to 200 nm, or less. In certain cases, the heater has a thickness of greater than or equal to 20 nm, greater than or equal to 50 nm, greater than or equal to 100 nm, or more.

In some cases, the heater comprises a material capable of performing resistive heating. For example, the heater may be electronically coupled to an external electrical circuit (e.g., via power leads) such that, when current is passed through the electrical circuit, the resistance of the heater causes resistive heating (i.e., joule heating) to occur. The heat generated by such resistive heating can, in some cases, heat the article and/or an electrochemical device comprising the article. In certain cases, the heater comprises a metal or metal alloy. For example, the heater may comprise a resistive metal or metal alloy (e.g., metals or metal alloys having relatively high resistivities), in order to promote resistive heating, in accordance with certain embodiments. Examples of materials that the heater may comprise include, but are not limited to, nickel alloys (such as nichrome, Constantan, Evanohm, etc.), stainless steel, graphite, silicon-based compounds, combinations thereof, and the like. Generally, the material for the heater (e.g., a heater comprising a thin film) can be selected based on one or more properties, including the resistivity of the material, as explained in more detail below.

In some embodiments, the heater comprises a conductive wire. For example, in FIG. 7A or 7B, heater 140 is a conductive wire, rather than a thin film, in accordance with some, but not necessarily all embodiments. The conductive wire may be deposited onto the article (e.g., immediately adjacent to the substrate, or on an intervening layer) to form a conductive track on the article. As in the case of the heater comprising a thin film, a heater comprising a conductive track may be formed, in some cases, using a patterned mask on the substrate or a layer on the substrate. In some cases, the conductive wire of the heater is electronically coupled to an external circuit, as is described above for the heaters comprising thin films, such that electrical current may be passed through the conductive wire, thereby causing resistive heating. The conductive wire of the heater may form any number of patterns or paths along the article, depending on the desired area of heating from the heater. For example, in some cases, the conductive wire is relatively straight along areas of the article where substantial heating may not be desired, but forms, for example, a serpentine pattern near areas that are desired to be substantially heated (e.g., near current collector bridges in some cases in which the heater is used to actively cause a heat-induced change in volume of the substrate).

In embodiments in which the heater comprises a conductive wire, the heater may comprise any of a number of suitable materials having sufficient resistivity to cause a desired heating of the article. For example, in some cases, the heater comprising a conductive wire comprises a metal and/or metal alloy. As described above for heaters comprising thin films, the conductive wire may comprise a resistive metal or resistive metal alloy. Examples of the material for the conductive wire of the heater include, but are not limited to, nickel alloys (such as nichrome, Constantan, Evanohm, etc.), stainless steel, graphite, silicon-based compounds, combinations thereof, and the like. As mentioned above, the material for the heater comprising a conductive wire may be selected in order to achieve a desired resistance for the heater.

The resistance of a heater (e.g., a heater comprising a thin film or a heater comprising a conductive wire) can, in some cases, be determined using Eq. 2:

$$R = \frac{\rho L}{A} \qquad (2)$$

where R is the resistance of the heater, $\rho$ is the resistivity of the material of which the heater is made, L is the length of the heater in the direction of electrical current flow through the heater, and A is the cross-sectional area of the heater through which electrical current flows. As can be seen from Eq. 2, the desired resistance of the heater may, in some cases, be achieved by selecting materials based on their resistivity, $\rho$, with materials having greater resistivity leading to greater resistances. Additionally, the geometry of the heater may be chosen in order to determine the resistance of the heater. For example, as can be seen from Eq. 2, heaters with greater length dimensions have greater resistance (e.g., longer conductive wires, greater length dimensions of thin films in the direction of current flow (e.g., between two power leads)). The cross-sectional area, A, through which current flows in the heater is inversely related to the resistance, according to embodiments that satisfy Eq. 2. As such, the resistance of the heater may be increased by using thinner conductive wires (e.g., wires with small diameters or cross-sectional dimensions), in embodiments in which the heater comprises conductive wires. In some cases in which the heater is or comprises a thin film, the resistance can be expressed using Eq. 3:

$$R = \frac{\rho L}{tw} \qquad (3)$$

where t is the thickness of the thin film and w is the width of the thin film in a direction perpendicular to the direction of current flow (e.g., perpendicular to the length dimension). As such, the geometry of the thin films, including the thicknesses and width of the thin films, can be adjusted during fabrication of the article (e.g., by varying the width of the thin film or by adjusting the thickness of the thin films) in order to adjust the resistance of the heater, in accordance with certain embodiments.

The resistance of the heater may be important in cases in which resistive heating (e.g., joule heating) is used as at least one of the mechanisms of heating. The heat produced during resistive heating, as measured in terms of power, is generally proportional to the square of the electrical current and linearly proportional to the resistance. Therefore, heaters having a greater resistance will provide greater heating for a given electrical current passed through the heater, according to certain embodiments. In some embodiments, the heater has a relatively high resistance. For example, in some cases, the heater has an electrical resistance of greater than or equal to 50Ω, greater than or equal to 60Ω, greater than or equal to 75Ω, greater than or equal to 100Ω, greater than or equal to 125Ω, greater than or equal to 150Ω, greater than or equal to 200Ω, and/or up to 300Ω, up to 400Ω, up to 500Ω, up to 1,000Ω, or more, at room temperature (23° C.). Combinations of the above ranges are possible. For example, in some cases, the heater has an electrical resistance of greater than or equal to 50Ω and less than or equal to 1000Ω.

In some embodiments, the heater is electronically isolated from (e.g., not electronically coupled to) certain other components of the article and/or components of an electrochemical device comprising the article. For example, in some cases, the heater is not electronically coupled to the plurality of discrete electrode segments. Having the heater be electronically isolated from the discrete electrode segments may prevent current being passed through the heater from electronically interfering with the electrochemical operation of an electrochemical device comprising the article during charging and/or discharging and, similarly, prevent current being passed through the heater from electronically interfering with electrochemical operation of the electrochemical device. In some embodiments, the heater is not electronically coupled to the current collector domain. Having heater not be electronic the coupled to the current collector domain (e.g., current collector domain 121) may also avoid interference with the operation and performance of an electrochemical device comprising the article, according to certain embodiments.

The heater may be prevented from being electronically coupled to the plurality of discrete electrode segments and/or the current collector domain of the article via a variety of methods. For example, the heater may be placed at the end of the article and physically separated from the discrete electrode segments and the current collector domain as is shown in FIG. 7B. In some embodiments (e.g., in embodiments in which the heater is integrated into the interior of the article, as is shown in FIG. 7A), the heater may be prevented from being electronically coupled to the discrete electrode segments and/or the current collector domain by incorporating one or more intervening layers between the heater and the discrete electrode segments and/or the current collector domain. In some embodiments, at least a portion of the heater is coated with an electrically insulating material. For example, the heater may be coated with an electrically insulating polymer coating over some or all of the heater such that it is not in direct contact with the current collector domain or the discrete electrode segments. In some cases, a coating (e.g., a protective polymer coating) is applied to the heater (e.g., a thin film heater or a heater comprising a conductive wire) such that the heater is physically isolated from the electrolyte in cases in which the article is incorporated into an electrochemical device.

In some cases, the heater is electrically coupled to an external circuit. For example, the heater may be coupled to an external circuit (e.g., via power leads in contact with the heater) corresponding to a battery control system and management circuitry, in accordance with certain embodiments. The battery control system may, upon receiving certain signals or readings of the battery conditions (e.g., temperature, current, pressure, etc.), initiate the application of current (e.g., by applying a voltage) to the heater, thereby causing the heater to heat at least a portion of the article, in accordance with certain embodiments. In some cases, the heater is configured to be actuated by one or more sensors, described in more detail below. For example, the heater may be electronically coupled to a battery control system and management circuitry that is configured to receive signals from one or more sensors that are adjacent to the substrate of the article. The one or more sensors may be configured to send a signal to the battery control system (e.g., when a temperature is above a temperature threshold or a pressure is below a pressure threshold), which, in turn, may send a signal to that actuates the heater to cause it to start, stop, or adjust its heating.

Figure 8A:
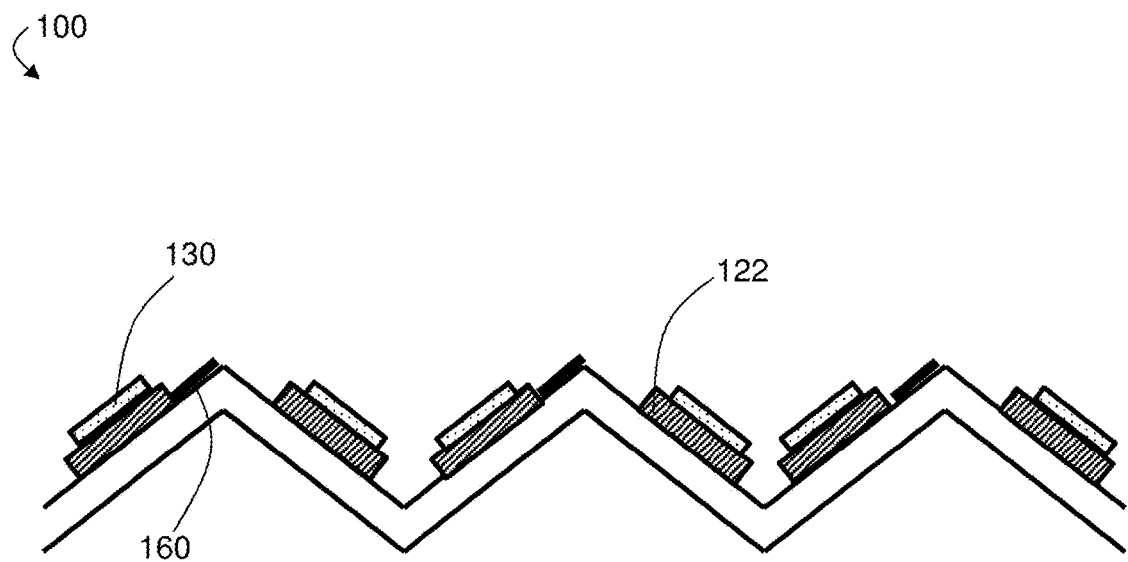
FIG. 8A is an exemplary schematic illustration depicting a side view of a part of an article, according to certain embodiments.
Figure 8B:
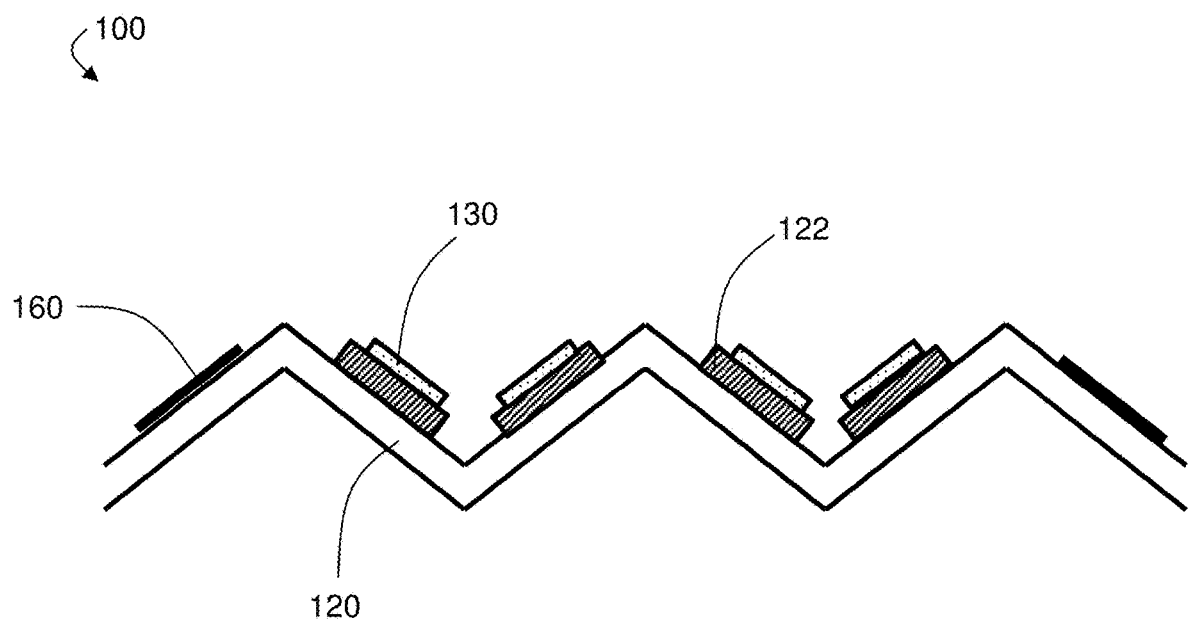
FIG. 8B is an exemplary schematic illustration depicting a side view of a part of an article, according to one set of embodiments.

In some embodiments, the article described herein comprises one or more sensors. In certain cases, the one or more sensors is adjacent to the substrate of the article. Incorporation of sensors into the article may be useful for monitoring the status or the performance of the article, such as in cases in which the article is part of an electrochemical device (e.g., a battery), according to certain embodiments. The one or more sensors may, at least in part, allow for detecting a condition (e.g., temperature, pressure) of an electrochemical device. In some cases, the one or more sensors adjacent to the substrate is configured to respond to a condition of the article. FIG. 8A depicts exemplary article 100 comprising sensor 160 configured to respond to a condition (e.g., temperature, pressure) of article 100. It should be understood that while, in some cases, the one or more sensors is immediately adjacent to the substrate (e.g., attached, coated, or vacuum deposited directly on to the substrate with no intervening layers or structures between the one or more sensors and the substrate, as is illustrated in FIG. 8A and FIG. 8B), in certain cases, the sensor is disposed directly on or more components (e.g., layers) of the article that are not the substrate. FIG. 8A shows a plurality of sensors 160, each next to (but not in direct contact with) a discrete electrode segment and/or a discrete current collector segment, in accordance with certain embodiments. In some embodiments, the distance between the heater and the substrate is less than or equal to 5 mm, less than or equal to 3 mm, less than or equal to 2 mm, less than or equal to 1 mm, less than or equal to 0.5 mm, less than or equal to 0.2 mm, less than or equal to 0.1 mm, or less.

As in the case of the heater described above, in some cases, the one or more sensors replaces (i.e., "takes the place of") one or more discrete electrode segments and/or components of the current collector domain in the article structure. For example, in cases in which discrete current collector segments are deposited at periodic locations along the substrate during fabrication (e.g., via a skip coating process), one or more of the locations may be masked such that a current collector segment is not deposited there, and, at a later step, a sensor is placed at that one or more locations (e.g., following an unmasking step).

In some embodiments, the one or more sensors is located near one or more of the ends of the article. For example, in some, but not necessarily all cases, no discrete electrode segments or current collector segments are located between the one or more sensors and an end of the substrate (referring to the ends according to a long axis of the substrate). For example, FIG. 8B shows a non-limiting embodiment in which sensor 160 is positioned near the end of article 100, as opposed to an interior location such as is shown in the illustration of FIG. 8A. Placing the sensor at or near one of the ends of the article may assist with ease of fabrication (e.g., by potentially avoiding complicated masking steps) and allow for easy access to the sensor even when the article is folded, in accordance with certain, but not necessarily all embodiments. However, in certain cases, placing the one or more sensors in an interior location, such as is shown in FIG. 8A, may be useful in detecting and providing localized information about the condition of the article (e.g., the temperature or pressure experienced by individual discrete electrode segments). As mentioned above and described in more detail below, in some cases, the article is foldable in some embodiments. In some such cases, the one or more sensors is positioned between folded sections of the article when the article is folded. Such a configuration may, in certain embodiments, allow for the one or more sensors to easily respond to conditions of interior portions (e.g., folds) of the article and/or a folded electrochemical device comprising the article.

In some embodiments, at least one of the one or more sensors is a temperature sensor configured to respond to a temperature of the article. For example, FIG. 8A depicts sensor 160 adjacent to substrate 120 of article 100, according to certain embodiments. In some cases, the temperature sensor is capable of measuring the temperature of at least a portion of the article. In certain cases, the temperature sensor responds (e.g., by sending an electrical signal) that varies based on the temperature at the sensor. In certain cases, the temperature sensor responds when a temperature above or below certain pre-determined temperatures are detected. Incorporation of temperature sensors in the article or an electrochemical device comprising the article may, in accordance with certain but not necessarily all embodiments, allow for the detecting and/or monitoring of the temperature of substantially the entire article or, in some cases, the temperature near individual discrete electrode segments.

The temperature sensor can be any of a number of suitable types of temperature sensor. In some cases, the temperature sensor is or comprises a thermocouple. In certain cases, the temperature sensor is or comprises a thermistor. In some embodiments, the temperature sensor is or comprises a resistance temperature detector (RTD). A thermocouple or a thermistor may be, for example, commercially acquired and incorporated into the article, or the thermocouple may be fabricated incorporated into the article during the manufacturing of the article itself. In some, but not necessarily all embodiments, the temperature sensor is or comprises a thin film. In embodiments in which the temperature sensor (e.g., thermocouple, thermistor, RTD) is fabricated during the manufacture of the article, the temperature sensor may be formed on a portion of the article (e.g., the substrate or one or more other layers) by any number suitable methods, such as vacuum deposition methods (e.g., sputtering, evaporation). The temperature sensor may comprise a material having a known resistance versus temperature profile. Examples of materials the temperature sensor may comprise include, but are not limited to, platinum, nickel, copper, iron, or combinations thereof. In one non-limiting example, the temperature sensor is an RTD comprising an electrically non-conductive layer (e.g., a ceramic layer) on which a material having a known resistance versus temperature profile (e.g., platinum, nickel, copper, iron) is deposited (e.g., in a serpentine pattern). The material having a known resistance versus temperature profile may be electronically coupled to an external circuit (e.g., a computer system and/or a battery control system).

In some embodiments, at least one of the one or more sensors is a pressure sensor. For example, referring again to FIG. 8A, sensor 160 is a pressure sensor, in accordance with certain embodiments. The pressure sensor may be configured to respond to a pressure experienced by the article. In some cases, the pressure sensor is capable of measuring the pressure or force experienced by at least a portion of the article. In certain cases, the pressure sensor responds (e.g., by sending an electrical signal) that varies based on the pressure at the sensor. In certain cases, the pressure sensor responds when a pressure above or below certain pre-determined pressures is detected. Detecting the pressure experienced by the article or a portion thereof may be useful for detecting problems in an electrochemical device comprising the article (e.g., during cycling of a battery stack) or determining a risk for damage of the electrochemical device (e.g., in cases in which excessive forces being applied to the electrochemical device), in accordance with some, but not necessarily all embodiments.

The pressure sensor can be any of a variety of type of suitable pressure sensors. In some cases, the pressure sensor is a capacitance-based pressure sensor. One example of a capacitance-based pressure sensor is one comprising two electrodes with an electrically insulative material positioned between the two electrodes. The electrically insulative material may have a known dielectric constant. In certain cases, the electrically insulative material is configured such that the force applied to the capacitive-based sensor comprising the two electrodes in the electrically insulative material causes the thickness of the electrically insulative material to change, thereby varying a measured capacitance between the two electrodes. For example, in some cases, the electrically insulative material positioned between the two electrodes is a polymeric material. The polymeric material may be relatively soft and have a known dielectric constant. In some cases, the pressure sensor is or comprises a strain gauge. In certain embodiments, the pressure sensor comprises a piezoelectric or piezoresistive sensor. Such sensors typically comprises piezoelectric or piezoresistive materials coupled to an external electrical circuit capable of detecting and measuring change in electric charge or resistance upon mechanical deformation of the materials. In certain embodiments, the pressure sensor is or comprises a thin film. Non-limiting examples of pressure sensors (e.g., in thin film form) are described in F. Schmaljohann, D. Hagedorn, and F. Löffler. "Thin Film Sensors for measuring small forces." Journal of Sensors and Sensor Systems. No. 4, (February 2015), 91-95. In some cases, the pressure sensor is commercially available and attached or coupled to the article or an electrochemical device comprising the article. However, in some cases, the pressure sensor (e.g., a thin film pressure sensor) is fabricated during the manufacture of the article. In some such cases, the pressure sensor is formed by vacuum deposition, coating and curing (e.g., in the case of polymeric materials), printing (e.g., inkjet printing, screen-printing), and/or by spray methods (e.g., aerosol spray methods).

In some embodiments, the one or more sensors is electronically isolated from (i.e., not electronically coupled to) certain other components of the article and/or components of an electrochemical device comprising the article. For example, in some cases, the one or more sensors is not electronically coupled to the plurality of discrete electrode segments. Having the one or more sensors be electronically isolated from the discrete electrode segments may prevent current being passed through the one or more sensors from interfering with the operation of an electrochemical device comprising the article during charging and/or discharging and, similarly, prevent current being passed through the heater from interfering with operation of the electrochemical device. In some embodiments, the one or more sensors is not electronically coupled to the current collector domain. Having the one or more sensors not be electronically coupled to the current collector domain (e.g., current collector domain 121) may also avoid interference with the operation and performance of an electrochemical device comprising the article, according to certain embodiments.

The one or more sensors may be prevented from being electronically coupled to the plurality of discrete electrode segments and/or the current collector domain of the article via a variety of methods. For example, the one or more sensors may be placed at the end of the article and physically separated from the discrete electrode segments and the current collector domain as is shown in FIG. 8B. In some embodiments (e.g., in some embodiments in which the one or more sensors is integrated into the interior of the article, as is shown in FIG. 8A), the heater may be prevented from being electronically coupled to the discrete electrode segments and/or the current collector domain by incorporating one or more intervening layers between the one or more sensors and the discrete electrode segments and/or the current collector domain. In some embodiments, at least a portion of the one or more sensors is coated with an electrically insulating material. For example, the one or more sensors may be coated with an electrically insulating polymer coating over some or all of the one or more sensors such that it is not in direct contact with the current collector domain or the discrete electrode segments. In some cases, a coating (e.g., a protective polymer coating) is applied to the one or more sensors (e.g., a thin film temperature sensor or pressure sensor) such that the one or more sensors is physically isolated from the electrolyte in cases in which the article is incorporated into an electrochemical device.

In some cases, the one or more sensors is electronically coupled to an external circuit. For example, the one or more sensors may be coupled to an external circuit (e.g., via power leads in contact with the sensor) corresponding to a battery control system and management circuitry, in accordance with certain embodiments. The battery control system may, upon receiving certain signals or readings of the battery conditions (e.g., from the one or more sensors), initiate the application of current (e.g., by applying a voltage) to a heater described herein, thereby causing the heater to heat at least a portion of the article, in accordance with certain embodiments. Heating at least a portion of an electrochemical device using a heater that is a part of the electrochemical device due, at least in part, to a signal received in response to one or more sensors that are a part of the electrochemical device may allow for rapid electronic isolation of problematic discrete electrode segments (e.g., via a heat-induced volume change of the substrate), in accordance with certain, but not necessarily all embodiments. As another non-limiting example, the battery control system may receive a signal from a pressure sensor indicating that an applied pressure/force to the electrochemical device is below a threshold value and, upon receiving the signal, send a signal to a pressure applicator to increase the applied pressure.

In some embodiments, the sensor may interact with one or more processors, for example, to carry out any of the control schemes described herein. In some embodiments, one or more processors may be used to process a signal from a sensor, for example, to carry out any of the control schemes described herein. In some embodiments, the battery control system and/or management circuitry can comprises one or more processors. Examples of suitable processors are described in more detail below.

In some embodiments, the thickness of the current collector bus is greater than the thickness of at least one of the current collector bridges. For example, as shown in FIG. 2B, current collector bus 121 has a thickness dimension illustrated by thickness 161, while current collector bridge 123 has a thickness dimension illustrated by thickness 162. In accordance with certain embodiments, thickness 161 is greater than thickness 162. Having the current collector bridge have a greater thickness than that of at least one current collector bridge may allow, in certain cases, for the current collector bridge to be more mechanically robust (e.g., a greater applied force is required to cause failure) than the at least one current collector bridge. For example, in certain cases, changing the volume of the substrate causes both the current collector bus and the at least one current collector bridge to experience mechanical stress (e.g., tension, bending). In some cases, the mechanical stress results in the current collector bridge fracturing (e.g., due to ultimate tensile failure) but the current collector bus not fracturing, due to the greater thickness of the current collector bus. Such a scenario may allow for discrete electrode segments coupled to the current collector bus via the at least one current collector bridge to be electronically isolated upon a change in volume of the substrate without the current collector bus itself failing. In some such cases, an electrochemical device comprising such an article can still be charged and/or discharged after the loss of the electronic coupling between the at least one of the electrode segments and the current collector bus. Additionally, having a relatively large thickness of the current collector bus may allow for a decreased electrical resistance and an increased current-carrying capability for the overall current collector domain.

In some embodiments, the current collector bus has a thickness that is at least three times, at least four times, at least 5 times, at least 8 times, at least 10 times, at least 20 times, and/or up to 50 times, up to 75 times, or up to 100 times greater than the thickness of at least one of the current collector bridges.

In some embodiments, one or more components of the current collector domain are part of a unitary structure. For example, in some embodiments, the current collector bus and the plurality of current collector segments are part of a unitary structure. Two or more components are part of a unitary structure if the component are formed of the same material or a consistent combination of materials (e.g., a single metal alloy) and without breaks. In other words, a unitary structure is a single piece made of a single material or a consistent combination of materials, as opposed to multiple pieces in contact with each other. For example, referring to FIG. 2A, in certain embodiments, current collector bus 121 and the plurality of current collector segments that include current collector segment 122 are part of a unitary structure. In some cases, the entire current collector domain forms a unitary structure. Referring to FIGS. 2A and 2B, while current collector bus 121, current collector segment 122, and current collector bridge 123 associated with current collector segment 122 are illustrated as three separate components, in certain embodiments, collector bus 121, current collector segment 122 and current collector bridge 123 form a unitary structure (e.g., a unitary structure of copper metal or copper alloy). In some cases, each current collector segment and a current collector bridge associated with the current collector segment are part of a unitary structure. Forming one or more component of the current collector domain, such as the current collector bus, the plurality of current collector segments, and the current collector bridges associated with the current collector segments, as a unitary structure may simplify fabrication of the article. For example, having the current collector bus and the plurality of current collector segments be part of a unitary structure may eliminate certain fabrication steps (e.g., by allowing for simultaneous fabrication of the current collector bridges and the current collector segments).

In some embodiments, the article is configured such that, above a threshold current (e.g., either an electrical discharge current or an electrical charging current passing through the current collector domain), at least one of the current collector bridges is mechanically deformed. The mechanical deformation may, in certain cases be caused by the current collector bridge melting (e.g., resistive heating). In certain cases, the current collector bridge is mechanically deformed due to thermal shock caused by the electrical current reaching the threshold current. In some embodiments, the at least one current collector bridge is mechanically deformed such that a current collector segment electronically coupled to that current collector bridge is no longer electronically coupled to the current collector bus. Such a situation may occur, in accordance with certain embodiments, when the current collector bridge is configured to "blow out" due to excessive current (i.e., current above a threshold current) such that the flow path of current along the current collector bridge is interrupted.

The threshold current referred to herein is the electrical current that, when reached (e.g., due to short circuiting), causes the mechanical deformation of the at least one current collector bridge such that a current collector segment associated to that current collector bridge becomes decoupled from the current collector bus. In some embodiments, the article is configured such that the threshold current referred to herein falls within a certain range of currents. For example, the article may be configured such that the threshold current is high enough that a loss of electronic coupling between the current collector bridge and the current collector bus (e.g., due to the mechanical deformation) does not occur during normal operation of an electrochemical device comprising the article (e.g., normal charging and/or discharging without short-circuiting or thermal runaway occurring). As such, the article may be configured in certain embodiments such that the threshold current of the article is greater than or equal to 10 A. It should be understood that a threshold current of an article falling within a certain range of currents means that the specific current at which the article is configured, upon a mechanical deformation of at least one current collector bridge, to undergo at least one electronic decoupling as described herein, falls within that range. An article configured to have a threshold current of 100 A is one example of an article for which the threshold current is greater than or equal to 10 A, because 100 A falls within the range of values greater than or equal to 10 A.

In some embodiments, the article may be configured such that the threshold current is low enough that the loss of electronic coupling between the current collector segment and the current collector bus occurs at a low enough current that significant damage to the article and/or an electrochemical device comprising the article does not occur prior to the loss of coupling. As such, the article may be configured in certain embodiments such that the threshold current of the article is less than or 120 A. As another non-limiting example, an article configured to have a threshold current of 90 A is an article for which the threshold current is less than or equal to 120 A, because 90 A falls within the range of values less than or equal to 120 A.

Figure 9A:
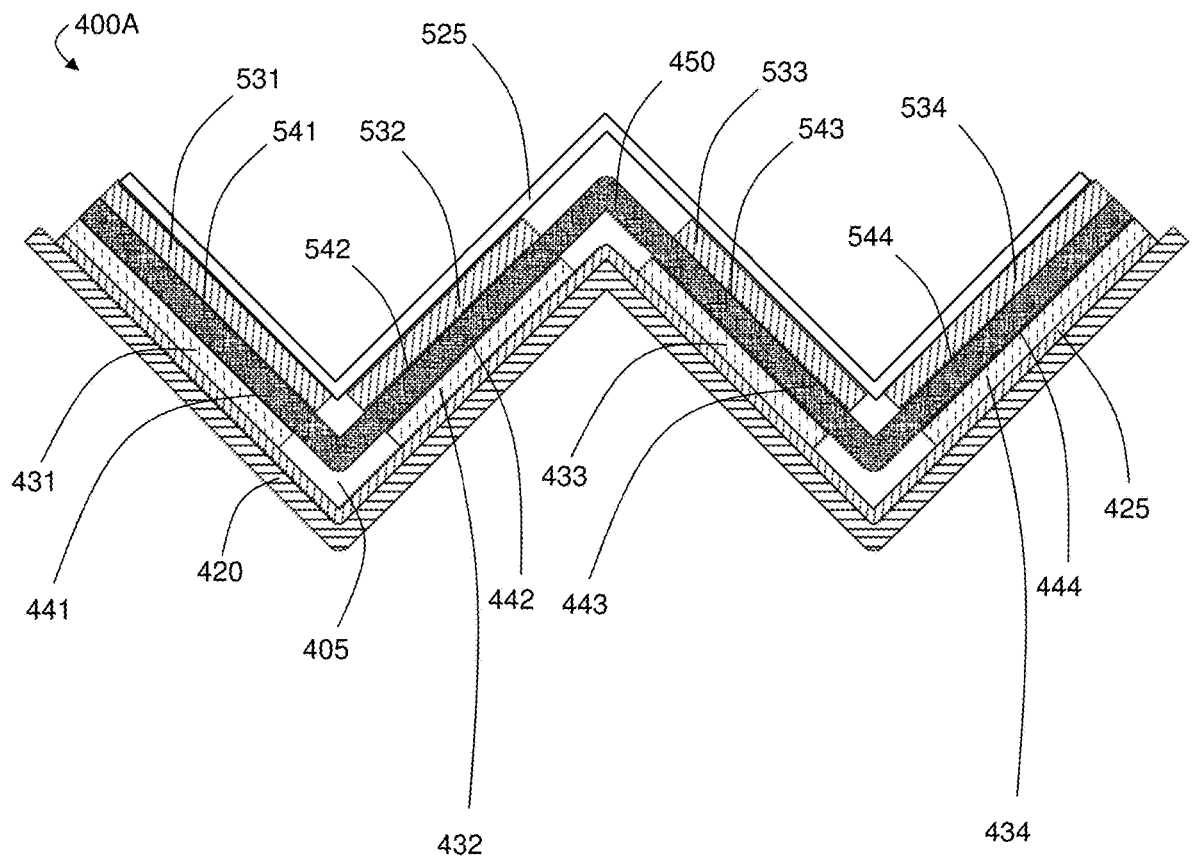
FIG. 9A is an exemplary schematic illustration depicting a cross-sectional side view of a part of a partially unfolded electrochemical device, according to certain embodiments.
Figure 9B:
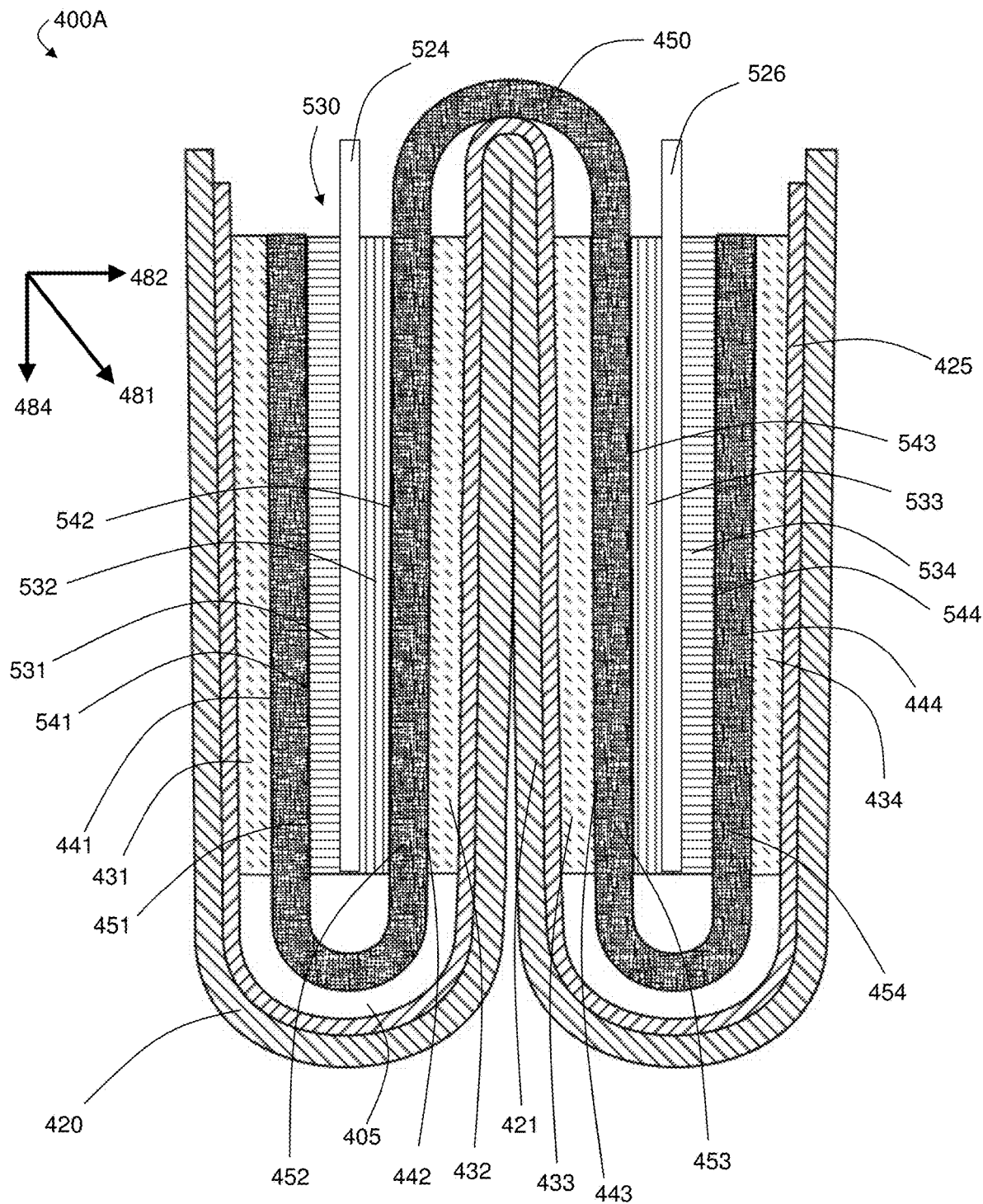
FIG. 9B is an exemplary schematic illustration depicting a cross-sectional side view of a part of a folded electrochemical device, according to one set of embodiments.
Figure 10A:
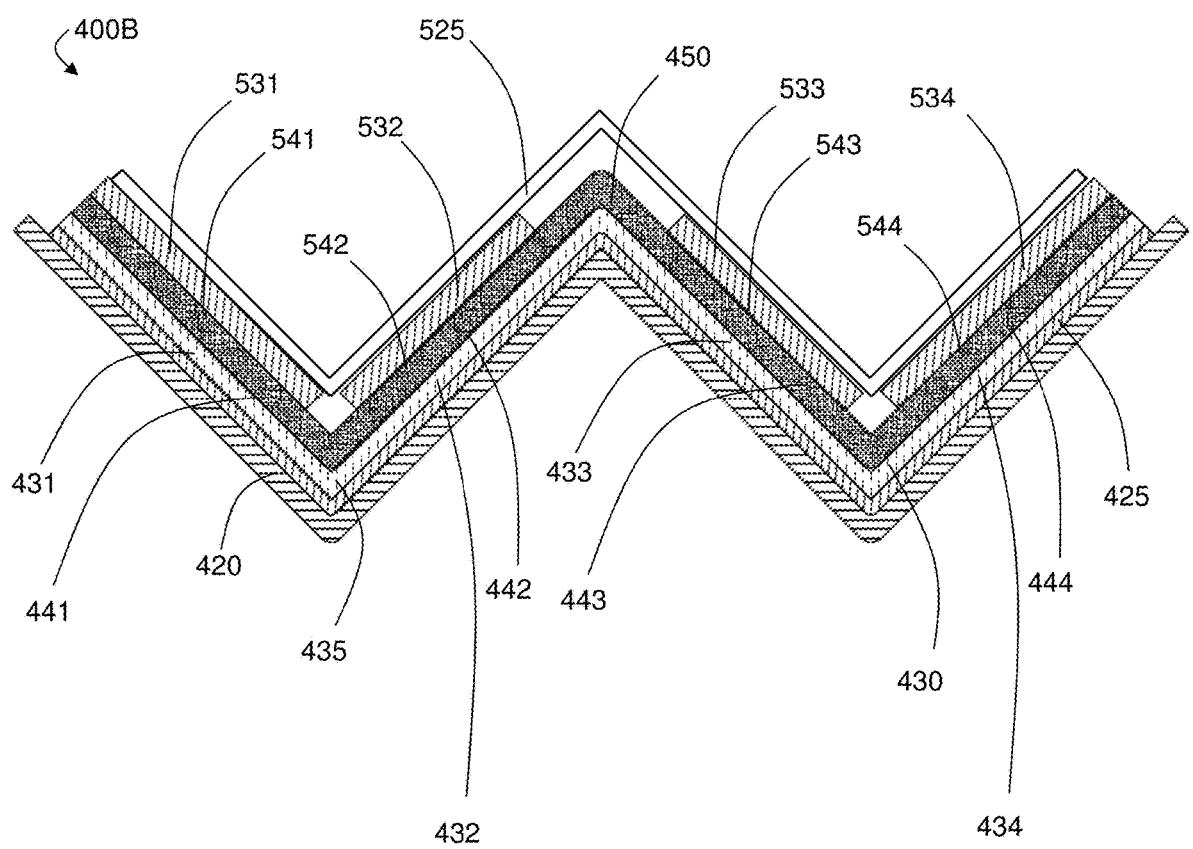
FIG. 10A is an exemplary schematic illustration depicting a cross-sectional side view of a part of a partially unfolded electrochemical device, according to certain embodiments.
Figure 10B:
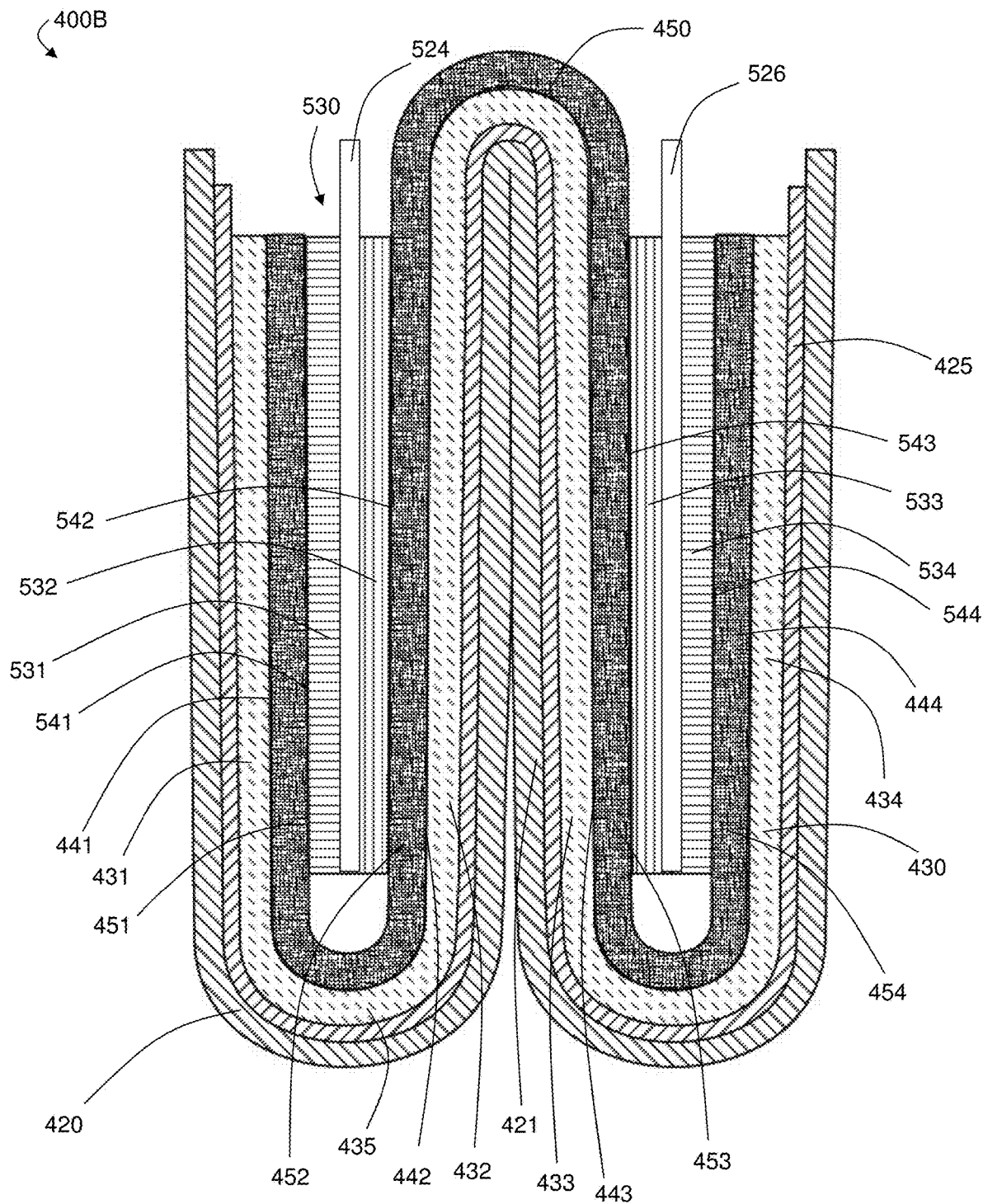
FIG. 10B is an exemplary schematic illustration depicting a cross-sectional side view of a part of a folded electrochemical device, according to certain embodiments.

In some embodiments, one or more components of the articles and systems described herein are continuous structures. "Continuous," as used to describe a relationship between two sections, layers, or portions of a structure, means that there exists at least one pathway from the first section, layer, or portion to the second section, layer, or portion that passes only through the structure. E.g., a continuous sheet of material, folded upon itself or folded around a different material, can define two or more sections or portions that remain part of the continuous sheet, because there exists at least one pathway from the first section to the second section that passes only through the sheet (e.g., a pathway that travels from the first section along and around the fold, and to the second section). Referring to FIGS. 10A-10B, first anode portion 431, second anode portion 432, and folded anode region 435 of electrochemical device 400B are sections of a structure (e.g., anode), and that structure is continuous with respect to first anode portion 431 and second anode portion 432 because there exists a pathway from first anode portion 431, through folded anode region 435, and to second anode portion 432 that passes only through the structure that includes first anode portion 431, second anode portion 432, and folded anode region 435. In contrast, referring to FIGS. 9A-9B, first anode portion 431 and second anode portion 432 of electrochemical device 400A are not continuous, because any pathway from first anode portion 431 to second anode portion 432 must pass through at least one structure (e.g., separator 450, first cathode portion 531, gap 405) that does not include first anode portion 431 and second anode portion 432.

In some embodiments, the current collector bus is a continuous layer. For example, referring to FIG. 1, current collector bus 121 is a continuous layer, as opposed to being formed of a plurality of discrete layers or sections. Having a continuous current collector bus may be useful for a variety of reasons. For example, loss of an electrical connection between the current collector bus and a component of an external circuit (e.g., an electrode tab) at one section of the current collector bus (e.g., due to a failure) does not necessarily disrupt electronic coupling between the current collector bus at that section and other components of the external circuit that form electrical connections at other sections of the current collector bus, due to the continuous conductive path. For example, referring to FIG. 1, an electrical connection to external components such as electrode tabs are made at section 203 and section 205 of current collector bus 121, according to certain embodiments. Electrical current generated at discrete electrode segment 130a may be transferred to external components either at section 203 or section 205 of current collector bus 121. Because current collector bus 121 is continuous, a loss of electrical connection between current collector bus 121 and an external component at section 203 does not prevent transfer of electrical current generated at discrete electrode segment 130a to the external circuit, because discrete electrode segment 130a is still electrically coupled to current collector bus 121 at section 205.

Other components of the articles and systems described herein can also be continuous, as mentioned above. For example, the substrate of the article may be continuous. Referring to FIG. 1, any two sections of substrate 120 are continuous, according to certain embodiments. Having a continuous substrate can allow for simplified fabrication of the article described herein as well as of multi-cell batteries. For example, when the substrate is continuous, the article described herein can be fabricated by attaching (e.g., via coating or deposition) the current collector domain and the plurality of discrete electrode segments onto a single continuous substrate, rather than having to individually manufacture discrete electrode segments, substrate segments, and/or components of the current collector domain and then attaching them (e.g., to form the article or a battery stack). Other components of the systems described herein that may be continuous include, but are not limited to, a separator and/or a second electrode of an electrochemical device that comprises the article, as described in more detail below.

The article described herein may be fabricated according to any suitable method. In some cases in which the substrate is continuous, the current collector domain and/or the discrete electrodes are formed on the substrate. Non-limiting examples of techniques that can be used to form the current collector domain (including the current collector bus and the optional current collector segments and current collector bridges) as well as the plurality of discrete electrode segments include coating and deposition methods such casting, evaporative deposition, vacuum deposition, or spin-coating. One non-limiting example of a suitable vacuum deposition is sputtering.

One illustrative but non-limiting method of forming the article involves starting with a substrate comprising a release layer comprising a suitable material (e.g., polyvinyl alcohol). A mask can then patterned onto the substrate such that when a thin layer of metal (e.g., copper) is coated on to the substrate, regions (i.e., voids/gaps) of the substrate are not coated directly with the metal. Following the coating of the metal to form at least a part of the current collector domain, an electrode active material (e.g., lithium and/or lithium alloy) can be coated or deposited onto the metal layer (e.g., on the regions of the metal layer corresponding to current collector segments). Subsequent release of the substrate from the mask material results in the article described herein, according to certain embodiments. In some cases, the patterning of the mask on the substrate is designed such that regions of the coated metal correspond to current collector bridges, and in certain cases, the metal (e.g., copper metal) is deposited continuously and with a greater thickness at the edge of the article in order to create a current collector bus with an increased thickness relative to other components of the current collector domain.

The use of a continuous substrate and/or a continuous current collector bus when manufacturing a multi-cell battery can avoid the laborious steps associated with fabricating batteries having stacked arrangements, resulting in a faster, easier, and less expensive manufacturing process. For example, having a continuous substrate (e.g., a release layer) upon which other components of the article (e.g., the current collector domain and the plurality of discrete electrode segments) can be deposited or coated obviates the need for cutting out separate laminate cells, arranging them, and making numerous external electrical contacts.

Figure 2C:
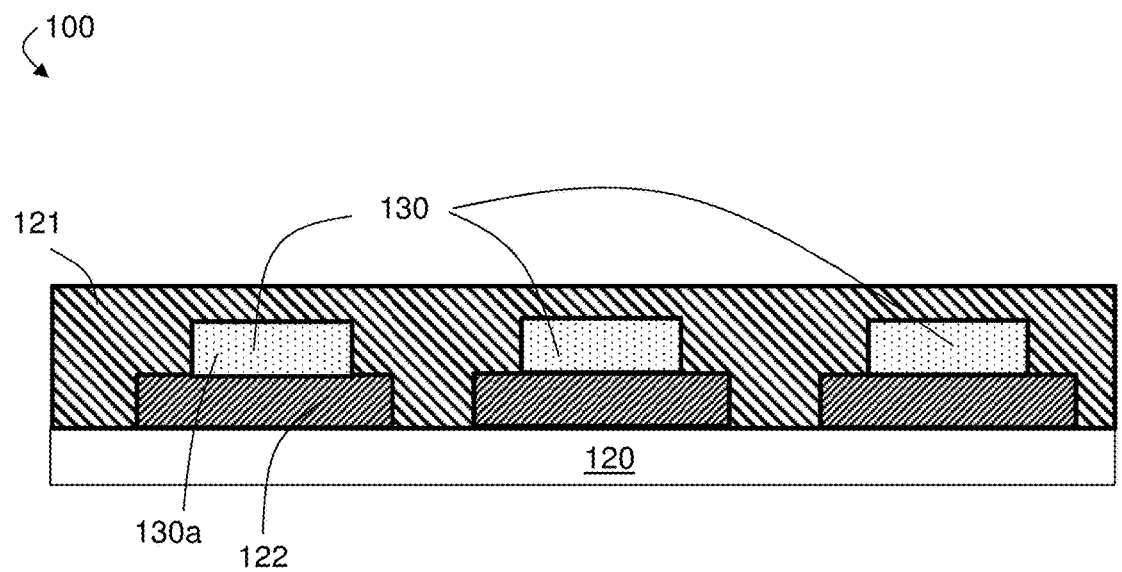
FIG. 2C is an exemplary schematic illustration depicting a side view of an article, according to certain embodiments.
Figure 5:
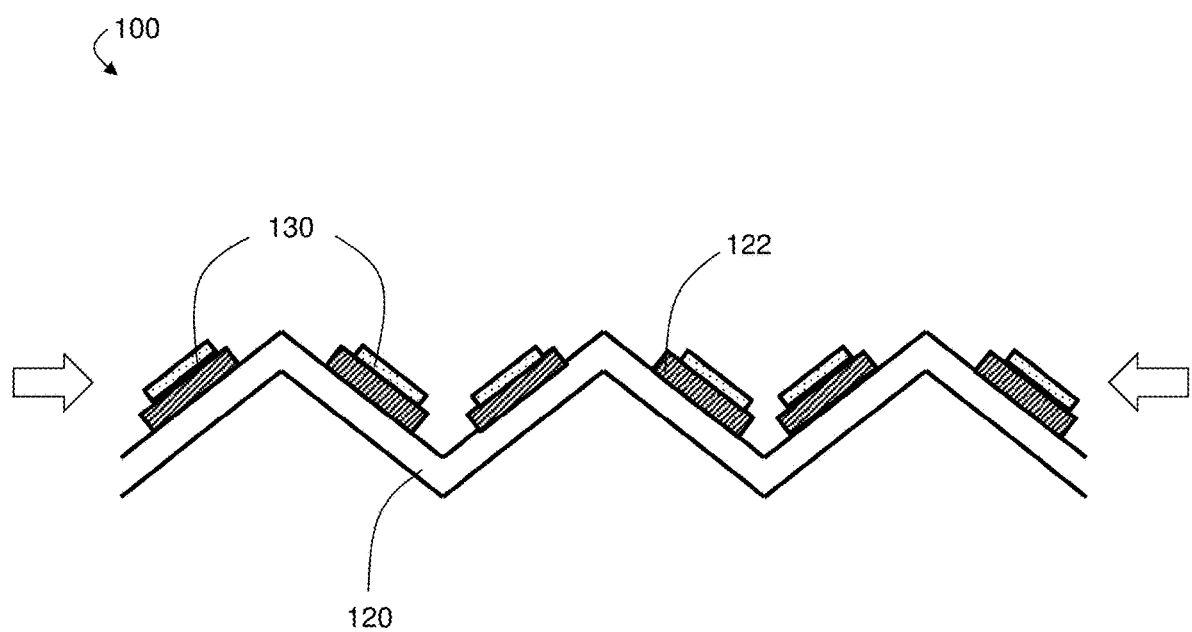
FIG. 5 is an exemplary schematic illustration depicting a cross-sectional side view of an article, according to certain embodiments.

In some embodiments, the article may be folded. It may be particularly useful to fold the article when one or more components (e.g., the substrate, the current collector bus) are continuous. FIG. 2C shows a side view schematic of unfolded article 100 comprising continuous substrate 120 (e.g., prior to folding). FIG. 5 shows a side view schematic of article 100 that is partially folded (with full folding involving folding according to the two block arrows shown in FIG. 5), in accordance with certain embodiments. It should be noted that current collector bus 121 is omitted from article 100 in FIG. 5 for clarity. Folding the article may involve folding the substrate at the voids/gaps between discrete electrode segments and/or current collector segments. Referring again to FIG. 5, substrate 120 is folded at the voids between each current collector segment of the plurality of current collector segments that includes current collector segment 122. In folding the article in such a way, "double-sided" electrodes are formed, with each side of the double-sided electrode comprising a discrete electrode segment (e.g., a discrete electrode segment from the plurality of discrete electrode segments 130). The use of double-side electrodes may provide for a battery with a relatively high volumetric energy density, which can be desirable in a number of applications.

In another aspect, electrochemical devices are described. In some embodiments, an electrochemical device comprises at least one anode and at least one cathode. It should be understood that although the article described above comprising a current collector bus and a plurality of discrete electrode segments may be included in the folded electrochemical device, other electrode geometries and configurations may be used in the folded electrochemical device. In certain cases, the electrochemical device comprises a separator (e.g., a continuous or serpentine separator). The electrochemical device may be useful, in some cases, as a battery (e.g., a multi-cell battery such as a rechargeable lithium battery). As mentioned above, in some cases, the electrochemical device is folded. In some, but not necessarily all cases, a folded electrochemical cell is easier and/or more economical to produce, and is capable of having a relatively high volumetric energy density, when compared to electrochemical devices formed with a stacked design rather than a folded design.

In some embodiments, the electrochemical device comprises multiple electrode portions. For example, in some embodiments, the electrochemical device comprises a plurality of anode portions. Each anode portion of the electrochemical device may comprise an anode active surface portion. In some cases, the electrochemical device comprises a first anode portion comprising a first anode active surface portion, a second anode portion comprising a second anode active surface portion, a third anode portion comprising a third anode active surface portion, and a fourth anode portion comprising a fourth anode active surface portion. In certain embodiments, each of the first anode portion, the second anode portion, the third anode portion, and the fourth anode portion comprise lithium and/or a lithium alloy as an anode active material.

In some embodiments, at least some of the anode portions of the electrochemical device are discrete (e.g., discrete electrodes). For example, in some instances, each of the first anode portion, the second anode portion, the third anode portion, and the fourth anode portion are discrete. Referring to FIG. 9A, which shows a schematic cross-sectional view of a partially unfolded electrochemical device for clarity, electrochemical device 400A comprises first anode portion 431 comprising first anode active surface portion 441, second anode portion 432 comprising second anode active surface portion 442, third anode portion 433 comprising third anode active surface portion 443, and fourth anode portion 434 comprising fourth anode active surface portion 444. In accordance with certain embodiments of electrochemical device 400A in FIG. 9A, each of first anode portion 431, second anode portion 432, third anode portion 433, and fourth anode portion 434 are discrete. Such discrete anode portions may, in some cases, be fabricated via skip coating or using deposition techniques (e.g., evaporative deposition, vacuum deposition such as sputtering) coupled with the use of one or more masks.

In some embodiments, the electrochemical device (e.g., folded electrochemical device) comprises a continuous anode. For example, referring to FIG. 10A, electrochemical device 400B comprises continuous anode 430. The anode portions of the electrochemical device may be part of the continuous anode. For example, in certain embodiments, the first anode portion, the second anode portion, the third anode portion, and the fourth anode portion are part of a continuous anode. Referring to FIG. 10B, first anode portion 431, second anode portion 432, third anode portion 433, and fourth anode portion 434 are each a part of continuous anode 430. As mentioned, above first anode portion 431 and second anode portion 432 are part of a continuous anode, at least because there exists a pathway (e.g., via folded anode region 435) between first anode portion 431 and second anode portion 432 that is part of the structure (e.g., anode) that includes first anode portion 431 and second anode portion 432. As mentioned above, in some, but not necessarily all cases, a continuous electrode (e.g., a continuous anode) can provide for folded electrochemical devices (e.g., a multi-cell battery) for which fabrication and the establishment of electrical connections is relatively facile and inexpensive.

The distinction between anode portions of the electrochemical device (e.g., the first anode portion, the second anode portion, etc.) may be established, in some cases, by folds in the electrochemical device. For example, in some cases, at least a portion of a continuous anode is folded to establish a section of the anode on one side of the fold (e.g., a first anode portion) and a section of the anode on the other side of the fold (e.g., a second anode portion). In other cases, the distinction between anode portions of the electrochemical device is established by the anode portions being discrete anode portions. In some such cases, the discrete anode portions are located in sections of the electrochemical device separated by a fold.

In some embodiments, the active surface portions of certain anode portions of the folded electrochemical cell face each other. For example, in some cases, the second anode surface portion faces the first anode active surface portion. FIG. 9B depicts a cross-sectional view of exemplary electrochemical device 400A, where second anode active surface portion 442 is facing first anode active surface portion 441, according to certain embodiments. In some cases, the fourth anode active surface portion faces both the first anode active surface portion and the third anode active surface portion. In some such cases, the third anode portion is at least partially positioned between the first anode portion and the fourth anode portion. FIG. 9B shows an embodiment of electrochemical device 400A where third anode portion 433 is at least partially positioned between first anode portion 431 and fourth anode portion 434, and where fourth anode active surface portion 444 is facing both first anode active surface portion 441 and third anode active surface portion 443.

As used herein, a surface (or surface portion) is said to be "facing" an object when the surface and the object are substantially parallel, and a line extending normal to and away from the bulk of the material comprising the surface intersects the object. For example, a first surface (or first surface portion) and a second surface (or second surface portion) can be facing each other if a line normal to the first surface and extending away from the bulk of the material comprising the first surface intersects the second surface. A surface and a layer can be facing each other if a line normal to the surface and extending away from the bulk of the material comprising the surface intersects the layer. A surface can be facing another object when it is in contact with the other object, or when one or more intermediate materials are positioned between the surface and the other object. For example, two surfaces that are facing each other can be in contact or can include one or more intermediate materials between them.

In some cases, the active surface portions of certain anode portions of the folded electrochemical device face away from each other. For example, in some cases, the third anode active surface portion faces away from both the first anode active surface portion and the second anode active surface portion. FIG. 9B depicts third anode active surface portion 443, which is facing away from both first anode active surface portion 441 and second anode active surface portion 442.

As used herein, a surface (or surface portion) is said to be "facing away from" an object when the surface and the object are substantially parallel, and no line extending normal to and away from the bulk of the material comprising the surface intersects the object. For example, a first surface (or first surface portion) and a second surface (or second surface portion) can be facing away from each other if no line normal to the first surface and extending away from the bulk of the material comprising the first surface intersects the second surface. A surface and a layer can be facing away from each other if no line normal to the surface and extending away from the bulk of the material comprising the surface intersects the layer. In some embodiments, a surface and another object (e.g., another surface, a layer, etc.) can be substantially parallel if the maximum angle defined by the surface and the object is less than about 10°, less than about 5°, less than about 2°, or less than about 1°.

In some embodiments, the electrochemical device comprises a plurality of cathode portions. Each cathode portion of the electrochemical device may comprise a cathode active surface portion. In some cases, the electrochemical device comprises a first cathode portion comprising a first cathode active surface portion, a second cathode portion comprising a second cathode active surface portion, a third cathode portion comprising a third cathode active surface portion, and a fourth cathode portion comprising a fourth cathode active surface portion.

In some embodiments, at least some of the cathode portions of the electrochemical device are discrete (e.g., discrete electrodes). For example, in some instances, each of the first cathode portion, the second cathode portion, the third cathode portion, and the fourth cathode portion are discrete. Referring to FIG. 9A, electrochemical device 400A comprises first cathode portion 531 comprising first cathode active surface portion 541, second cathode portion 532 comprising second cathode active surface portion 542, third cathode portion 533 comprising third cathode active surface portion 543, and fourth cathode portion 534 comprising fourth cathode active surface portion 544. In accordance with certain embodiments of electrochemical device 400A in FIG. 9A, each of first cathode portion 531, second cathode portion 532, third cathode portion 533, and fourth cathode portion 534 are discrete. Such discrete cathode portions maybe fabricated using any suitable method, such as via skip coating or using deposition techniques (e.g., evaporative deposition, vacuum deposition such as sputtering) coupled with the use of one or more masks.

In some embodiments, the electrochemical device (e.g., folded electrochemical device) comprises a continuous cathode. The cathode portions of the electrochemical device may be part of the continuous cathode. For example, in certain embodiments, the first cathode portion, the second cathode portion, the third cathode portion, and the fourth cathode portion are part of a continuous cathode. Though not pictured explicitly in the FIGS. 9A-10B, first cathode portion 531, second cathode portion 532, third cathode portion 533, and fourth cathode portion 544 may, in accordance with certain embodiments, be part of a continuous cathode.

As with the anode portions described above, the distinction between cathode portions of the electrochemical device may be established, in some cases, by folds in the electrochemical device. For example, in some cases, at least a portion of a continuous cathode is folded to establish a section of the cathode on one side of the fold (e.g., a first cathode portion) and a section of the cathode on the other side of the fold (e.g., a second cathode portion). In other cases, the distinction between cathode portions of the electrochemical device is established by the cathode portions being discrete cathode portions. In some such cases, the discrete cathode portions are located in sections of the electrochemical device separated by a fold.

In some embodiments, two electrode portions may be arranged to form a double-sided electrode, with a first face and second face facing away from the first face, both faces comprising electrode active material and active surfaces. For example, in some cases, a folded electrochemical device described herein may comprise a double-sided cathode. One non-limiting example is an electrochemical device comprising a first cathode portion and a second cathode portion, with the first cathode portion forming at least a part of a first side of a double-sided cathode, and the second cathode portion forming at least a part of a second side of the double-sided cathode. Such an arrangement is possible in cases in which the first cathode portion and the second cathode portion are discrete cathodes, or in cases in which the first cathode portion and the second cathode portion are part of a continuous cathode. Referring to FIG. 9B, for example, first cathode portion 531 and second cathode portion 532 form double sided cathode 530, comprising first cathode active surface portion 541 facing away from second cathode active surface portion 542, in accordance with certain embodiments.

In some embodiments, the active surface portions of certain cathode portions of the folded electrochemical cell face certain anode active surface portions. For example, in some instances, the first cathode active surface portion faces the first anode active surface portion. FIGS. 9B and 10B depict cross-sectional views of exemplary electrochemical device 400A and exemplary electrochemical device 400B, respectively, where first cathode active surface portion 541 is facing first anode active surface portion 441, according to certain embodiments. In some cases, the second cathode active surface portion faces the second anode active surface portion, the third cathode active surface portion faces the third anode active surface portion, and the fourth cathode active surface portion faces the fourth anode active surface portion. In some, but not necessarily all cases, having the respective cathode active surface portions and anode active surface portions facing each other as described herein in results in a folded electrochemical device capable of comprising a plurality electrochemical cells (e.g., upon addition of electrolyte) in a relatively easy to manufacture and volumetrically energy-dense configuration.

As mentioned above and described in more detail below, in some embodiments, the electrochemical device comprises a separator. For example, FIGS. 9A-9B and FIGS. 10A-10B depict exemplary electrochemical device 400A and exemplary electrochemical device 400B, respectively, each of which comprises separator 450. In some cases, such as in embodiments in which the electrochemical devices is folded, the separator is folded as well. In some cases, the separator is arranged such that a first portion of the separator is between the first anode portion and the first cathode portion. For example, referring to FIG. 9B, first portion 451 of separator 450 is between first anode portion 431 and first cathode portion 531. In some cases, the separator is arranged such that it is positioned between multiple anode portions and cathode portions. For example, in some embodiments, the separator is arranged such that a first portion of the separator is between the first anode portion and the first cathode portion, a second portion of the separator is between the second anode portion and the second cathode portion, a third portion of the separator is between the third anode portion and the third cathode portion, and a fourth portion of the separator is between the fourth anode portion and the fourth cathode portion. For example, referring to FIG. 9B, first portion 451 of separator 450 is between first anode portion 431 and first cathode portion 531, second portion 452 of separator 450 is between second anode portion 432 and second cathode portion 532, third portion 453 of separator 450 is between third anode portion 433 and third cathode portion 533, and fourth portion 454 of separator 450 is between fourth anode portion 434 and fourth cathode portion 534. Such an arrangement is also depicted in electrochemical device 400B of FIG. 10B comprising continuous anode 430. The separator of the electrochemical device may, in certain cases, be a serpentine separator. For example, separator 450 in FIG. 9B is a serpentine separator, in accordance with certain embodiments. A serpentine separator, and other continuous separators, may, in some but not necessarily all embodiments, provide for a relatively easy to manufacture and effective component in folded electrochemical devices for providing an electronically insulating but ionically conductive pathway for electrochemical reactions while preventing problems such as short circuiting.

In some embodiments, the electrochemical device described herein comprises components arranged in a particular order. For example, the electrochemical device may comprise a plurality of anode portions, a plurality of cathode portions, and a separator (e.g., a serpentine separator), with the electrochemical device comprising the following, arranged in the following order: a first anode portion comprising a first anode active surface portion, a first separator portion, a first cathode portion comprising a first cathode active surface portion, a second cathode portion comprising a second cathode active surface portion, a second separator portion, a second anode portion comprising a second anode active surface portion, a third anode portion comprising a third anode active surface portion, a third separator portion, a third cathode portion comprising a third cathode active surface portion, a fourth cathode portion comprising a fourth cathode active surface portion, a fourth separator portion, and a fourth anode portion comprising a fourth anode active surface portion. FIG. 9B and FIG. 10B show exemplary electrochemical device 400A and exemplary electrochemical device 400B, respectively, each of which comprises such components arranged in such an order. Specifically, in FIG. 9B, from the left side of the figure to the right side of the figure, electrochemical device 400A comprises the following arranged in order: first anode portion 431 comprising first anode active surface portion 441, first separator portion 451, first cathode portion 531 comprising first cathode active surface portion 541, second cathode portion 532 comprising second cathode active surface portion 542, second separator portion 452, second anode portion 432 comprising second anode active surface portion 442, third anode portion 433 comprising third anode active surface portion 443, third separator portion 453, third cathode portion 533 comprising third cathode active surface portion 543, fourth cathode portion 534 comprising fourth cathode active surface portion 544, fourth separator portion 454, and fourth anode portion 434 comprising fourth anode active surface portion 444.

As described above and in more detail below, in some, but not necessarily all cases, the electrochemical device comprises a substrate. For example, in some cases, one or more electrodes is formed on the substrate (optionally with one or more intervening layers, such as a current collector). In some cases, one or more of the plurality of anodes is formed on the substrate. Referring again to FIG. 9A, exemplary electrochemical device 400A comprises substrate 420, in accordance with certain embodiments. In some, but not necessarily all embodiments, the substrate is adjacent to one or more of the plurality of anode portions. For example, in some cases, the electrochemical device comprises a substrate adjacent to each of the first anode portion, the second anode portion, the third anode portion, and the fourth anode portion. Referring again to FIG. 9B, substrate 420 is adjacent to each of first anode portion 431, second anode portion 432, third anode portion 433, and fourth anode portion 434. In certain embodiments, the substrate of the electrochemical device is continuous. For example, substrate 420 in FIG. 9A may be a continuous sheet comprising a polymer (e.g., a release layer), upon which one or more components of the electrochemical device is formed, such as a current collector (e.g., a current collector domain) and/or first anode portion 431, second anode portion 432, third anode portion 433, and fourth anode portion 434. In some embodiments, the substrate (e.g., substrate 420) is or comprises a release layer, described in more detail below. In certain cases, when the electrochemical device is folded, the substrate, or a portion thereof, is located between certain components of the electrochemical device. In some cases, a portion of the substrate is between the second anode portion and the third anode portion. For example, in folded electrochemical device 400A in FIG. 9B or folded electrochemical device 400B in FIG. 10B, substrate portion 421 is between second anode portion 432 and third anode portion 433.

The electrochemical devices (e.g., folded electrochemical devices) described herein may comprise one or more current collectors, as mentioned above. In some cases, the electrochemical device comprises an anodic current collector. The anodic current collector may be electronically coupled to an anode and/or a plurality of anode portions of the electrochemical device. In some cases, each of the anode portions of the electrochemical device is electronically coupled to a distinct current collector (e.g., a distinct discrete current collector). However, in some cases, the electrochemical device comprises an anodic current collector electronically coupled to each of the first anode portion, the second anode portion, the third anode portion, and the fourth anode portion. Each of FIGS. 9A-9B and FIG. 10B depict an electrochemical device comprising anodic current collector 425. In certain cases, anodic current collector 425 is electronically coupled to each of first anode portion 431, second anode portion 432, third anode portion 433, and fourth anode portion 434. In certain cases, such an anodic current collector is a continuous anodic current collector. For example, anodic current collector 425 in FIGS. 9A-9B and FIGS. 10A-10B is continuous, in accordance with certain embodiments. While certain specific current collector configurations (e.g., comprising a current collector domain comprising a plurality of current collector segments and current collector bridges) are described in this disclosure, it should be understood that in certain cases, the anodic current collector may comprise other configurations. For example, in some cases, the anodic current collector is a layer of electronically conductive material, portions of which are adjacent (e.g., directly adjacent or with one or more intervening layers) to the first anode portion, the second anode portion, the third anode portion, and the fourth anode portion.

In some embodiments, the electrochemical device comprises a plurality of cathodic current collectors and/or cathodic current collector portions. As one non-limiting example, electrochemical device may comprise a first cathodic current collector electronically coupled to the first cathode portion and a second cathodic current collector electronically coupled to the third cathode portion. Referring to FIG. 9B, electrochemical device 400A comprises optional first cathodic current collector portion 524 and optional second cathodic current collector portion 526, in accordance with certain embodiments. In some cases, the first cathodic current collector portion and the second cathodic current collector portion are part of a continuous cathodic current collector. The use of such a continuous cathodic current collector, as in the case of the other continuous components described above and below, can provide for facile manufacturing and a convenient arrangement for forming electrical connections to the cathodic portions of the folded electrochemical device, in accordance with some but not necessarily all embodiments. While first cathodic current collector portion 524 and second cathodic current collector portion 526 are not shown as being part of a continuous cathodic current collector in FIG. 9B and FIG. 10B, it should be understood that in some, but not necessarily all embodiments, first current collector portion 524 and second cathodic current collector portion 526 are part of a continuous cathodic current collector. For example, FIG. 9A and FIG. 10A, which depict partially unfolded electrochemical device 400A and electrochemical device 400B, respectively, show continuous cathodic current collector 525, in accordance with certain embodiments. In some cases, however, the first cathodic current collector portion and the second cathodic current collector portion are discrete. For example, in some, but not necessarily all embodiments, first cathodic current collector portion 524 and second cathodic current collector portion 526 are discrete current collectors. In some cases, the electrochemical device comprises a first cathodic current collector electronically coupled to the first cathode portion and a second cathodic current collector electronically coupled to the third cathode portion. For example, in accordance with certain embodiments, first current collector portion 524 is electronically coupled to first cathode portion 531, and second cathodic current collector 526 is electronically coupled to third cathode portion 533.

While certain of the electrochemical devices described and illustrated herein are described using a certain number of components (e.g., four anode portions and four cathode portions), it should be understood that the number of components described herein is non-limiting. For example, the electrochemical device may comprise a fifth (or sixth, or more) anode portion comprising a fifth (or sixth, or more) anode active surface portion and a fifth (or sixth, or more) cathode portion comprising a fifth (or sixth, or more) cathode active surface portion facing the fifth (or sixth, or more) anode active surface portion. Additionally, while the electrochemical devices are shown as a "W" fold (e.g., having three folds), in some cases the electrochemical device may comprise additional folds (and additional anode and cathode portions). For example, in some embodiments, the electrochemical device has at least 3 folds, at least 4 folds, at least 5 folds, at least 10 folds, and/or up to 12 folds, up to 15 folds, up to 20 folds, or more.

In certain embodiments, the electrochemical device (e.g., a folded electrochemical device) is constructed and arranged to avoid problems associated with the use of certain anode active materials or certain geometries. As a non-limiting example, one or more anodes of the electrochemical device may comprise lithium and/or a lithium alloy as an anode active material, which may form dendrites under certain conditions. As another non-limiting example, one or more anodes of the electrochemical device may undergo uneven utilization or overutilization in certain regions of the anode. In some cases, the dimensions and/or orientations of the anode (e.g., anode portions) are configured in order to address some such problems (e.g., uneven utilization or overutilization in certain areas).

Figure 11A:
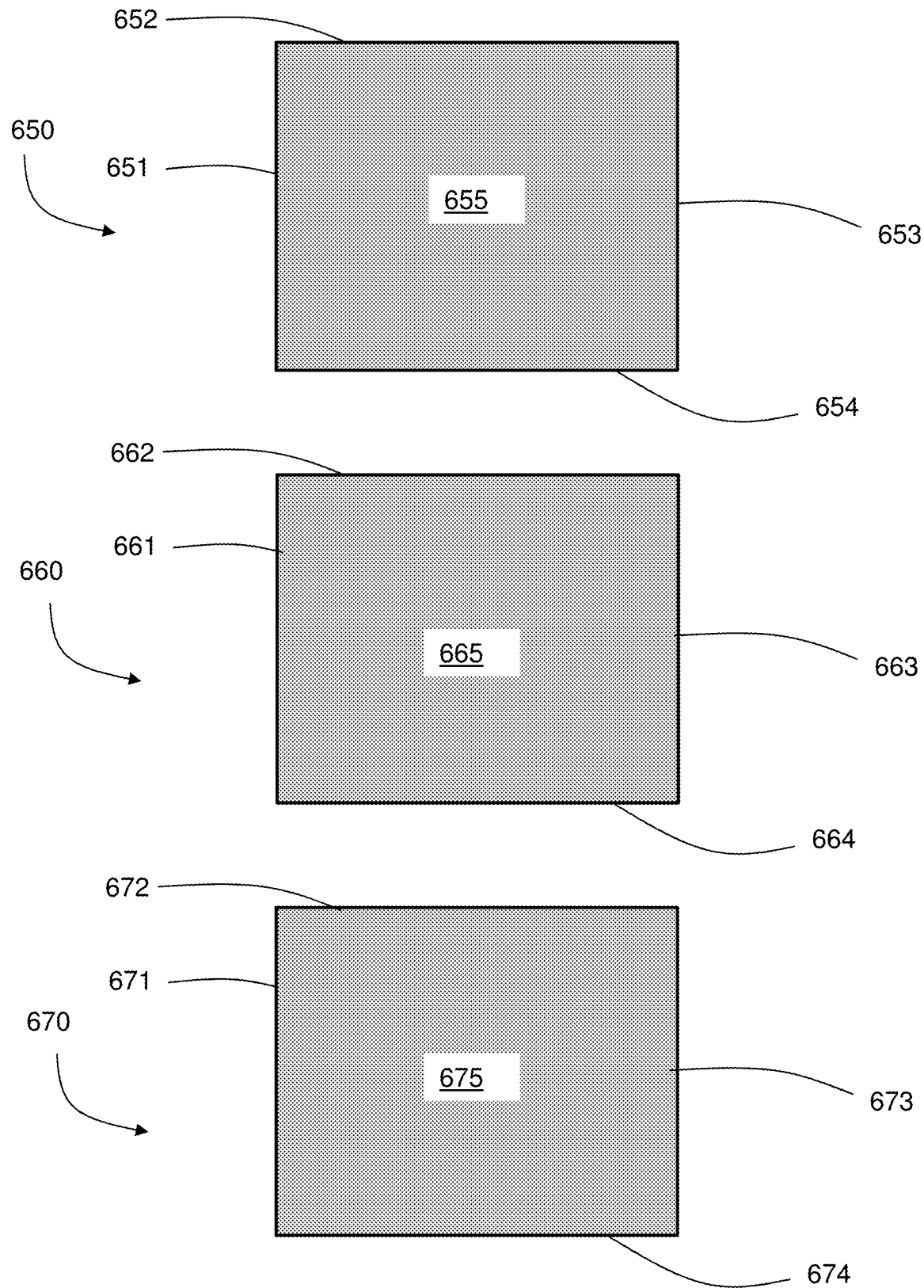
FIGS. 11A-11B depict a schematics showing cathode active surfaces and cathode active surface perimeters, according to certain embodiments.

One such way to avoid certain problems associated with certain anode materials is to use an "oversized" anode (or anodes) with respect to the cathode of the electrochemical device. For certain of the electrochemical devices described herein (e.g., folded electrochemical devices), an "oversized" anode is accomplished by configuring the electrochemical device such that a relatively high percentage of the perimeter of the cathode (e.g., cathode portions) is overlapped by anode active surface. Specifically, in some embodiments, the electrochemical device comprises a cumulative cathode active surface perimeter defined by the sum of the perimeters of all cathode active surfaces of the electrochemical device. In cases in which the plurality of cathode portions are discrete, the cumulative cathode active surface perimeter of the electrochemical device is defined by the sum of the perimeters of cathode active surfaces of each of the cathode portions. For example, referring to FIG. 11A, if the only cathodes of an exemplary electrochemical device are discrete cathode portion 650 having cathode active surface 655, discrete cathode portion 660 having cathode active surface 665, and discrete cathode portion 670 having cathode active surface 675, then the cumulative cathode active surface perimeter of the electrochemical device is the sum of the perimeter of cathode active surface 655 (i.e., cathode perimeter segment 651 plus cathode perimeter segment 652 plus cathode perimeter segment 653 plus cathode perimeter segment 654), the perimeter of cathode active surface 665 (i.e., cathode perimeter segment 661 plus cathode perimeter segment 662 plus cathode perimeter segment 663 plus cathode perimeter segment 664), and the perimeter of cathode active surface 675 (i.e., cathode perimeter segment 671 plus cathode perimeter segment 672 plus cathode perimeter segment 673 plus cathode perimeter segment 674).

Figure 11B:
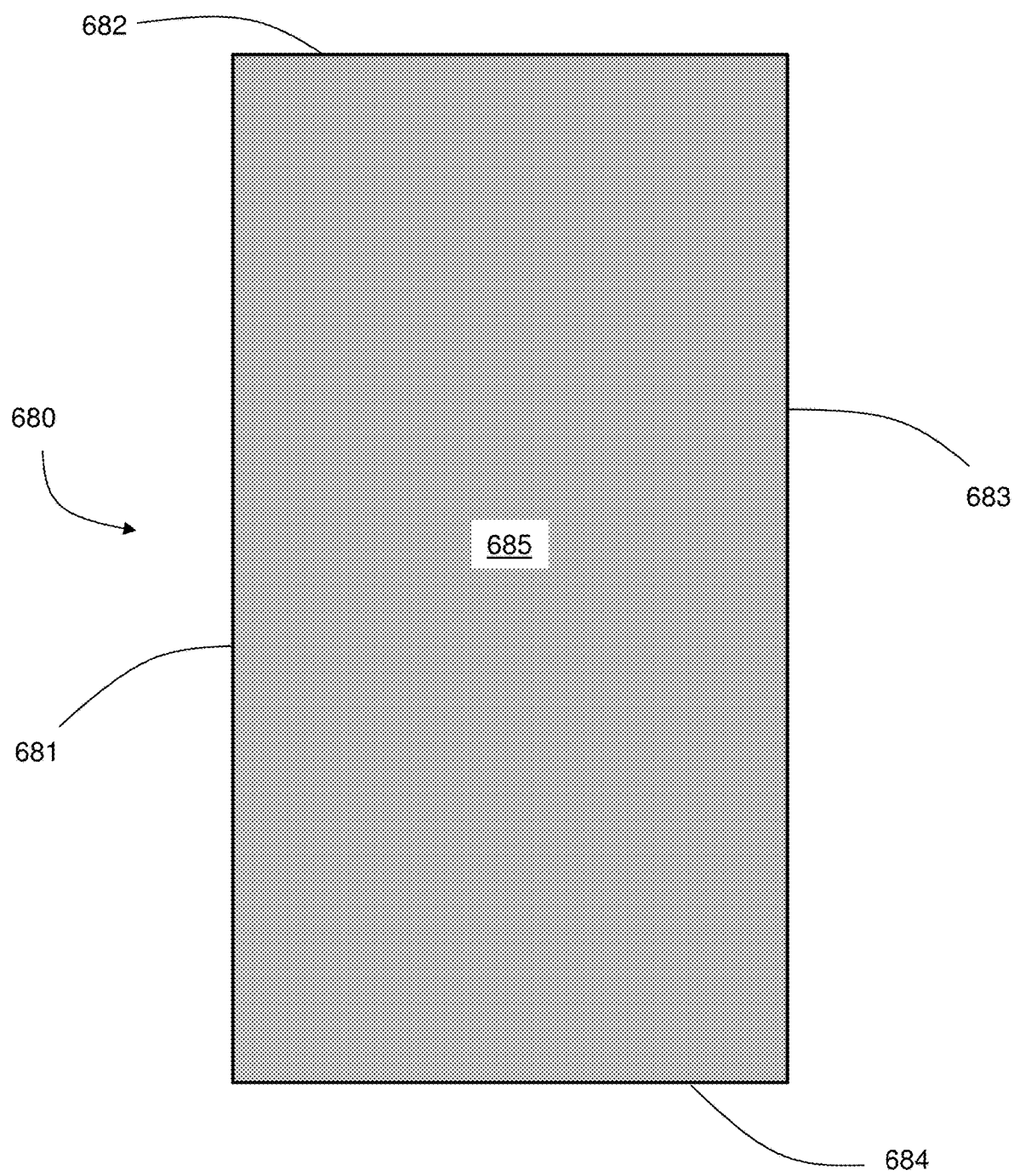

As another example, in cases in which the electrochemical device comprises a single continuous cathode, the cumulative cathode active surface perimeter of the electrochemical device is the perimeter of the cathode active surface of that continuous cathode. For example, referring to FIG. 11B, if the only cathode of an exemplary device is cathode 680 having cathode active surface 685, then the cumulative cathode active surface perimeter is the sum of cathode perimeter segment 681, cathode perimeter segment 682, cathode perimeter segment 683, and cathode perimeter segment 684.

In some embodiments, a relatively high percentage of the cumulative cathode active surface perimeter of the electrochemical device is overlapped by anode active surface. Such a configuration, in some but not necessarily all cases, may be useful in mitigating certain problems, such as dendrite formation in folded electrochemical devices. A point on the perimeter of a cathode active surface is overlapped by anode active surface if, on a line that intersects that point and is normal to the cathode perimeter, there exists a point inside the cathode perimeter and a point outside the cathode perimeter that is covered by the anode active surface. In other words, a point on the perimeter of the cathode active surface is overlapped by anode active surface if the anode active surface "extends" past the cathode active surface perimeter, rather than either not reaching the cathode active surface perimeter point or stopping directly at the cathode active surface perimeter point.

Figure 12:
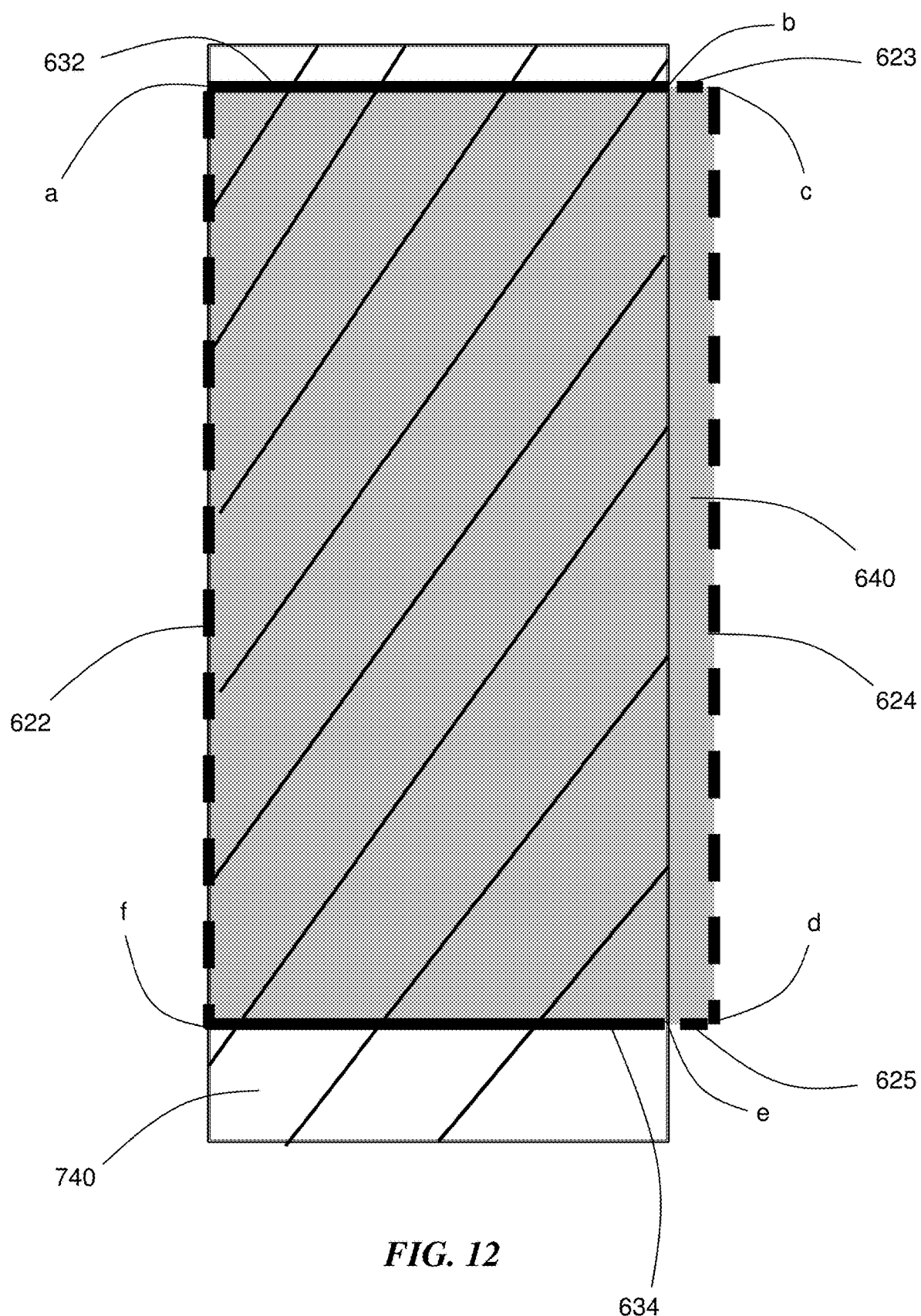
FIG. 12 depicts a schematic showing a cathode active surface and an anode active surface overlapping a certain at least some of the perimeter of the cathode active surface, according to certain embodiments.

FIG. 12 depicts a top-down view of cathode active surface 640 (indicated by gray shading). At least a portion of cathode active surface 640 is facing anode active surface 740 (indicated by diagonal hatching). In FIG. 12, cathode perimeter segment 632 (which spans from point a to point b) and cathode perimeter segment 634 (which span from point e to point f) are each overlapped by anode active surface 740, as indicated by the solid thick black lines. On the other hand, cathode perimeter segment 622 (which spans from point a to point f) is not overlapped by anode active surface 740 (as indicated by the thick dashed line) because anode active surface 740 reaches but does not extend past the cathode perimeter segment 622. Cathode perimeter segment 623 (which spans from point b to point c), cathode perimeter segment 624 (which spans from point c to point d), and cathode perimeter segment 625 (which spans from point d to point e) are not overlapped by anode active surface 740 (as also indicated by thick dashed lines) because anode active surface 740 does not reach cathode perimeter segment 623, cathode perimeter segment 624, or cathode perimeter segment 625. In the case where the cumulative cathode active surface perimeter of cathode active surface 640 is defined by the sum of cathode perimeter segment 622, cathode perimeter segment 623, cathode perimeter segment 624, cathode perimeter segment 625, cathode perimeter segment 632, and cathode perimeter segment 634, the percentage of the cumulative cathode active surface perimeter overlapped by anode active surface 640 is determined by dividing the sum of cathode perimeter segment 632 and cathode perimeter segment 634 by the cumulative cathode active surface perimeter. In some embodiments, at least 60%, at least 75%, at least 90%, at least 95%, at least 99%, or all of the cumulative cathode active surface perimeter is overlapped by anode active surface.

Figure 4:
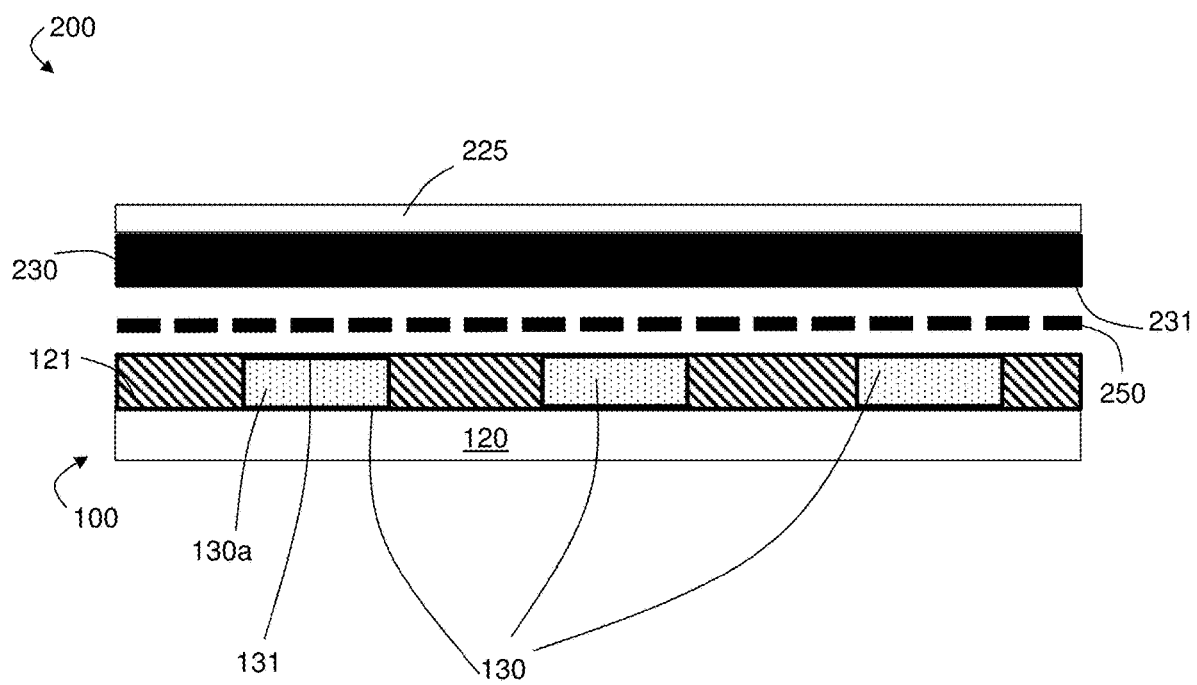
FIG. 4 is an exemplary schematic illustration depicting a cross-sectional side view of an electrochemical device, according to certain embodiments.

As mentioned above, in some embodiments, the article described above (e.g., comprising a substrate, a current collector bus, a plurality of discrete electrode segments, and optionally current collector segments and current collector bridges) is a component of an electrochemical device. FIG. 4 shows a schematic illustration of exemplary electrochemical device 200 comprising article 100. In some cases, the electrochemical cell described herein (e.g., an electrochemical device comprising the article having a plurality of discrete electrode segments) is a multi-cell structure. For example, in FIG. 4, electrochemical device 200 is a multi-cell structure. Some such electrochemical devices may be useful as part of a battery (e.g., a rechargeable lithium ion battery).

The electrochemical device (e.g., comprising the article) may comprise a second electrode. For example, referring again to FIG. 4, electrochemical device 200 comprises second electrode 230. The second electrode may comprise or be made of any suitable electrode active material. In some embodiments, the second electrode has a polarity that is the opposite of the polarity of the plurality of the discrete electrode segments. Generally, two electrodes are of opposite polarities if one is an anode and the other is a cathode. For example, in some cases the plurality of discrete electrode segments (e.g., plurality of discrete electrodes segments 130) is a plurality of anodes, and the second electrode (e.g., second electrode 230) of the electrochemical device is a cathode. The opposite arrangement is also possible. In certain cases, the active surface of the plurality of discrete electrode segments face the active surface of the second electrode. For example, in FIG. 4, discrete electrode segment 130a comprises active surface 131, second electrode 230 comprises active surface 231, and active surface 131 faces active surface 231.

Electrical contact can be made with the second electrode using any suitable technique. For example, the second electrode can be in electrical contact with a second current collector. FIG. 4 shows second current collector 225, which is adjacent and electronically coupled to second electrode 230. As with the current collector domain described above, the second current collector can comprise or be made of any suitable electronically conductive material (e.g., an electronically conductive metal such as aluminum). The second current collector may be immediately adjacent the second electrode (e.g., second current collector 225 may be in direct contact with second electrode 230), or one or more intervening layers (e.g., a primer layer) may be disposed between the second electrode and the second current collector (e.g., to facilitate adhesion between the second electrode and the second current collector).

As mentioned above, in some embodiments, the electrochemical device comprises a separator interposed between the plurality of discrete electrode segments and the second electrode. Referring, for example, to FIG. 4, electrochemical device 200 comprises separator 250 interposed between the plurality of discrete electrode segments 130 (e.g., a plurality of anodes) and second electrode 230 (e.g., a cathode). The separator may be a solid electronically non-conductive or electronically insulating material which electronically separates the anode and the cathode from each other preventing electronic short circuiting, and which permits the transport of ions between the anode and the cathode. In some embodiments, the separator may be porous and may be permeable to an electrolyte. In certain cases the separator is continuous, which may be useful in cases in which one or more of the electrodes of the electrochemical device (e.g., the second electrode) is continuous. For example, FIG. 4 shows an illustration of separator 250 where separator 250 is depicted as being continuous, according to certain embodiments.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in the electrochemical devices (including electrochemical cells) described herein are those comprising a microporous xerogel layer, for example, a microporous pseudo-boehmite layer, which may be provided either as a free standing film or by a direct coating application on one of the electrodes (e.g., the plurality of discrete electrode segments, the second electrode), as described in U.S. Pat. Nos. 6,153,337 and 6,306,545 by Carlson et al. of the common assignee. Solid electrolytes and gel electrolytes may also function as a separator in addition to their electrolyte function.

Figure 6A:
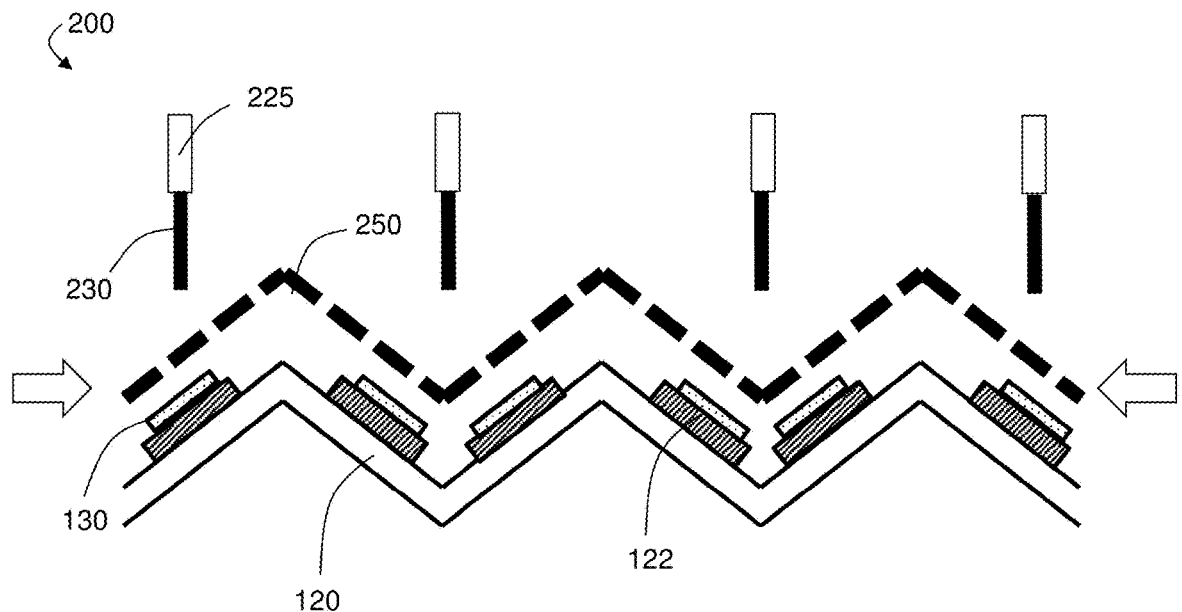
FIG. 6A is an exemplary schematic illustration depicting a side view of an electrochemical device, according to certain embodiments.

In some embodiments, the electrochemical device comprises a plurality of discrete second electrodes. For example, FIG. 6A shows a non-limiting embodiment of electrochemical device 200 comprising a plurality of discrete second electrodes including second electrode 230 (electronically coupled to second current collectors 225), separated from article 100 by separator 250. In accordance with certain embodiments, article 100 in FIG. 6A comprises substrate 120, the plurality of discrete electrode segments 130, plurality of current collector segments including current collector segment 122, as well as current collector bridge and a current collector bus not pictured). In certain cases, the discrete second electrodes are double-sided electrodes (e.g., electrodes with a first face and second face facing away from the first face, both faces comprising electrode active material and active surfaces). In some embodiments, electrochemical device 200 can be folded in a similar manner to as described above with respect to the folding of the article or other exemplary electrochemical devices described herein. For example, referring to FIG. 6A, article 100 and separator 250 (e.g., a continuous separator) are folded as indicated and pressed together in the directions indicated by the two block arrows, with each of the plurality of discrete second electrodes (e.g., second electrode 230) being covered by folded portions of separator 250, according to certain embodiments. A battery comprising a folded electrochemical device (e.g., a folded multi-cell structure as shown in FIG. 6A) may be easier and faster to produce than a battery that has a stacked configuration. Electrical connections (e.g., to an external load) can be made to such embodiments of the electrochemical device comprising discrete second electrodes via the discrete second current collectors (e.g., second current collectors 225 in FIG. 6A) as well as the current collector bus of the article (e.g., article 100).

While the plurality of discrete second electrodes are described as being associated with discrete second current collectors above, the electrochemical device may comprise a continuous second current collector segment, adjacent to the plurality of discrete second electrodes. Such an embodiment may allow for even easier fabrication (e.g., by skip-coating the electrode active material of the second electrode on to a continuous electronically conductive layer).

Figure 6B:
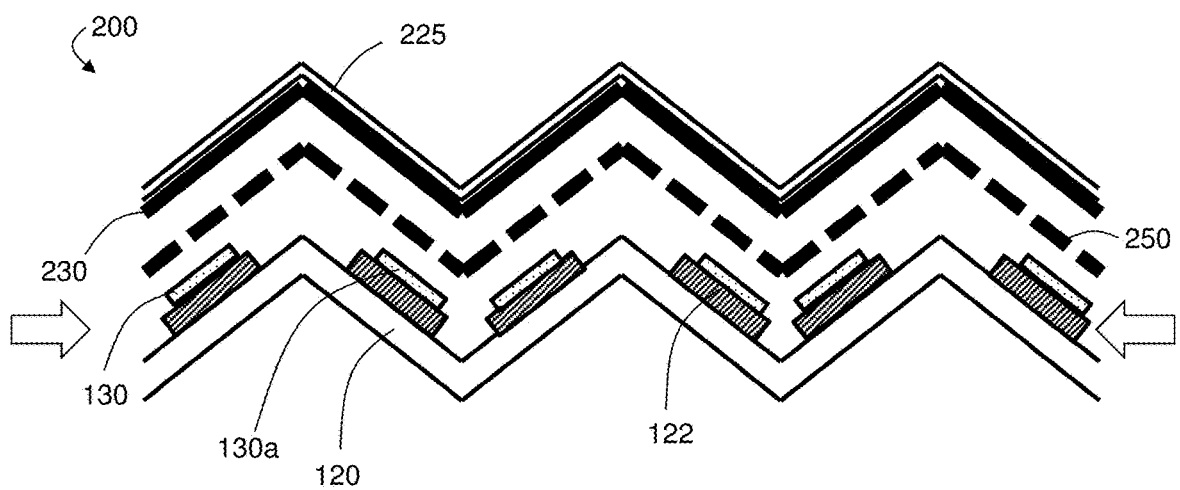
FIG. 6B is an exemplary schematic illustration depicting a side view of an electrochemical device, according to certain embodiments.

In some embodiments, the electrochemical device comprises a continuous second electrode. For example, FIG. 6B shows a non-limiting embodiment of electrochemical device 200 comprising continuous second electrode 230 (electronically coupled to second current collector 225), separated from article 100 by continuous separator 250. As in the case with the discrete second electrodes described above, the embodiment of electrochemical device 200 illustrated in FIG. 6B can, in certain embodiments, be folded. For example, referring to FIG. 6B, article 100, separator 250 (e.g., a continuous separator), second electrode 230, and continuous second current collector 225 are folded as indicated and pressed together in the directions indicated by the two block arrows, with each of the folded-over portions of second electrode 230 forming effectively a double-sided electrode that is covered by folded portions of separator 250, according to certain embodiments. Electrical connections (e.g., to an external circuit) can be made, for example, at the folds of the continuous second current collector.

A useful feature of some such folded electrochemical devices comprising a plurality of discrete second electrodes and/or a continuous second electrode electronically coupled to a continuous second current collector is that, in some such cases, there is a continuous electronic conduction path available to the second electrode. Therefore, if an electrical connection between the second current collector to an external circuit is disrupted (e.g., due to a manufacturing failure, or due to damage to the electrochemical device), electrical current generated at the second electrode in an area proximate to the disrupted electrical connection can flow along the second current collector until it reaches an undisrupted electrical connection.

In some cases, at least one of the discrete electrode segments in the electrochemical device loses electronic coupling with the current collector bus (e.g., due at least in part to a change in volume of the substrate of the article in the electrochemical device). In certain cases, on account of the article having a configuration described herein, the electrochemical device can still be charged and/or discharged after the loss of the electronic coupling between the at least one of the electrode segments and the current collector bus. Referring to FIG. 6B, in some cases, discrete electrode segment 130a loses electronic coupling with the current collector bus (not pictured) (e.g., due to a heat-induced change in volume of substrate 120). However, electrochemical device 200 in FIG. 6B, in accordance with certain embodiments, can still be charged/discharged even after the loss of coupling of discrete electrode segment 130a and the current collector bus. That is because the loss of coupling between discrete electrode segment 130a and the current collector bus leaves discrete electrode segment 130a electronically isolated from the rest of electrochemical device 200 (preventing problems such as thermal runaway), while at least some of the remaining discrete electrode segments are still electronically coupled to the current collector bus, thereby allowing electrochemical device 200 to be charged/discharged.

As mentioned above, in some embodiments, the substrate of the article or an electrochemical device described herein is or comprises a release layer. Release layers described herein are constructed and arranged to have one or more of the following features: relatively good adhesion to a first layer (e.g., a current collector domain, a plurality of discrete electrode segments, or in other embodiments, another layer of the substrate or other layer) but relatively moderate or poor adhesion to a second layer (e.g., from a structure used for fabrication of the article); high mechanical stability to facilitate delamination without mechanical disintegration; high thermal stability; and compatibility with processing conditions (e.g., deposition of layers on top of the release layer, as well as compatibility with techniques used to form the release layer). Release layers may be thin (e.g., less than about 10 microns) to reduce overall battery weight if the release layer is incorporated into the electrochemical device (e.g., electrochemical cell). A release layer should also be smooth and uniform in thickness so as to facilitate the formation of uniform layers on top of the release layer. Furthermore, release layers should be stable in the electrolyte and should not interfere with the structural integrity of the electrodes in order for the electrochemical cell to have a high electrochemical "capacity" or energy storage capability (i.e., reduced capacity fade). The use of release layers to remove a objects from one or more components of an electrochemical device are described in detail in U.S. patent application Ser. No. 12/862,513, filed on Aug. 24, 2010, entitled "Release System for Electrochemical Cells."

The substrate and/or release layer may be formed of, for example, a ceramic, a polymer, or a combination thereof. As such, the substrate and/or release layer may be semi-conductive or insulating. In some embodiments, the substrate and/or release layer comprises a polymeric material. In some cases, at least a portion of the polymeric material of the substrate and/or release layer is crosslinked; in other cases, the polymeric material(s) is substantially uncrosslinked. Examples of polymeric materials include, for example, hydroxyl-containing polymers such as poly vinyl alcohol, polyvinyl butyral, polyvinyl formal, vinyl acetate-vinyl alcohol copolymers, ethylene-vinyl alcohol copolymers, and vinyl alcohol-methyl methacrylate copolymers. As mentioned above, in some but not necessarily all embodiments, the substrate (e.g., including a release layer) comprise a heat-shrinkable film.

The electrodes described herein (e.g., the plurality of discrete electrode segments, the second electrode of the electrochemical device) can be anodes comprising a variety of anode active materials. For example, the anode may comprise a lithium-containing material, wherein lithium is the anode active material. Suitable electroactive materials for use as anode active materials in the anodes described herein include, but are not limited to, lithium metal such as lithium foil and lithium deposited onto a conductive substrate, and lithium alloys (e.g., lithium-aluminum alloys and lithium-tin alloys). Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

In one embodiment, an electroactive lithium-containing material of an anode comprises greater than 50% by weight of lithium. In another embodiment, the electroactive lithium-containing material of an anode comprises greater than 75% by weight of lithium. In yet another embodiment, the electroactive lithium-containing material of an anode comprises greater than 90% by weight of lithium. Additional materials and arrangements suitable for use in the anode are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

The electrodes described herein (e.g., the plurality of discrete electrode segments, the second electrode of the electrochemical device) can be cathodes comprising cathode active material. Suitable electroactive materials for use as cathode active materials in the cathodes include, but are not limited to, one or more metal oxides, one or more intercalation materials, electroactive transition metal chalcogenides, electroactive conductive polymers, sulfur, carbon and/or combinations thereof.

In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. Additional examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCo_xNi_yMn_{(1-x-y)}O_2$ (e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X may be greater than or equal to 0 and less than or equal to 2. X is typically greater than or equal to 1 and less than or equal to 2 when the electrochemical device is fully discharged, and less than 1 when the electrochemical device is fully charged. In some embodiments, a fully charged electrochemical device may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where ($0<x\leq1$), $LiMn_xNi_yO_4$ where ($x+y=2$) (e.g., $LiMn_{1.5}Ni_{0.5}O_4$), $LiNi_xCo_yAl_zO_2$ where ($x+y+z=1$), $LiFePO_4$, and combinations thereof. In some embodiments, the electroactive material within the cathode comprises lithium transition metal phosphates (e.g., $LiFePO_4$), which can, in certain embodiments, be substituted with borates and/or silicates.

As noted above, in some embodiments, the cathode active material comprises one or more chalcogenides. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in cathodes described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments, an electroactive sulfur-containing material of a cathode active material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathodes of the present invention may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode is in the range of 5-30% by weight of the cathode. In another embodiment, the amount of electroactive sulfur-containing material in the cathode is in the range of 20% to 90% by weight of the cathode.

Additional materials suitable for use in the cathode, and suitable methods for making the cathodes, are described, for example, in U.S. Pat. No. 5,919,587, filed May 21, 1997, entitled "Novel Composite Cathodes, Electrochemical Cells Comprising Novel Composite Cathodes, and Processes for Fabricating Same," and U.S. Patent Publication No. 2010/0035128 to Scordilis-Kelley et al. filed on Aug. 4, 2009, entitled "Application of Force in Electrochemical Cells," each of which is incorporated herein by reference in its entirety for all purposes.

In some embodiments, an electrode (e.g., a discrete electrode segment, an anode portion) of the electrochemical device may comprise one or more coatings or layers formed from polymers, ceramics, and/or glasses. The coating may serve as a protective layer and may serve different functions. Those functions may include preventing the formation of dendrites during recharging which could otherwise cause short circuiting, preventing reaction of the electrode active material with electrolyte, and improving cycle life. Examples of such protective layers include those described in: U.S. Pat. No. 8,338,034 to Affinito et al. and U.S. Patent Publication No. 2015/0236322 to Laramie at al., each of which is incorporated herein by reference in its entirety for all purposes.

The electrochemical devices described herein may comprise an electrolyte. The electrolyte can function as a medium for the storage and transport of ions, and in the special case of solid electrolytes and gel electrolytes, these materials may additionally function as a separator between an anode and a cathode. Any liquid, solid, or gel material capable of storing and transporting ions may be used, so long as the material facilitates the transport of ions (e.g., lithium ions) between an anode and the cathode. The electrolyte is electronically non-conductive to prevent short circuiting between an anode and a cathode. In some embodiments, the electrolyte may comprise a non-solid electrolyte.

In some embodiments, the electrolyte comprises a fluid that can be added at any point in the fabrication process. In some cases, the electrochemical device may be fabricated by providing a cathode and an anode, applying an anisotropic force component normal to the active surface of the anode, and subsequently adding the fluid electrolyte such that the electrolyte is in electrochemical communication with the cathode and the anode. In other cases, the fluid electrolyte may be added to the electrochemical device prior to or simultaneously with the application of an anisotropic force component, after which the electrolyte is in electrochemical communication with the cathode and the anode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, between 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolyte of the electrochemical devices (e.g., electrochemical cells) described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI). Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al., which is incorporated herein by reference in its entirety for all purposes.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate (CF$_3$SO$_3^-$), bis (fluorosulfonyl)imide (N(FSO$_2$)$_2^-$, bis (trifluoromethyl sulfonyl)imide ((CF$_3$SO$_2$)$_2$N$^-$, bis (perfluoroethylsulfonyl) imide((CF$_3$CF$_2$SO$_2$)$_2$N$^-$ and tris(trifluoromethylsulfonyl) methide ((CF$_3$SO$_2$)$_3$C$^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

In some embodiments described herein, a force, or forces, is applied to portions of an electrochemical device. Such application of force may reduce irregularity or roughening of an electrode surface of the cell (e.g., when lithium metal or lithium alloy anodes are employed), thereby improving performance. Electrochemical devices in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

The force may comprise, in some instances, an anisotropic force with a component normal to an active surface of the anode of the electrochemical device. In the embodiments described herein, electrochemical devices (e.g., rechargeable batteries) may undergo a charge/discharge cycle involving deposition of metal (e.g., lithium metal or other active material) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical device has been found, in accordance with certain embodiments described herein, to reduce such behavior and to improve the cycling lifetime and/or performance of the cell.

In some embodiments, the electrochemical device is constructed and arranged to apply, during at least one period of time during charge and/or discharge of the device, an anisotropic force with a component normal to the first anode active surface portion. Referring back to FIG. 9B, which illustrates an exemplary folded electrochemical device as described herein, a force may be applied in the direction of arrow 481. Arrow 482 illustrates the component of force 481 that is normal to first anode active surface portion 441 of first anode portion 431 as well as first cathode active surface portion 541 of first cathode portion 531.

In some embodiments, an anisotropic force with a component normal to an active surface of the anode is applied during at least one period of time during charge and/or discharge of the electrochemical device. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical device, but the magnitude of the forces in out-of-plane directions is substantially unequal to the magnitudes of the in-plane forces.

In one set of embodiments, cells described herein are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrochemical device. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

In some embodiments, an anisotropic force with a component normal to an active surface of the anode is applied, during at least one period of time during charge and/or discharge of the electrochemical device, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 78, at least about 98, at least about 117.6, at least about 147, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 196, less than about 147, less than about 117.6, less than about 98, less than about 49, less than about 24.5, or less than about 9.8 Newtons per square centimeter. In some cases, the component of the anisotropic force normal to the anode active surface may define a pressure of between about 4.9 and about 147 Newtons per square centimeter, between about 49 and about 117.6 Newtons per square centimeter, between about 68.6 and about 98 Newtons per square centimeter, between about 78 and about 108 Newtons per square centimeter, between about 4.9 and about 250 Newtons per square centimeter, between about 49 and about 250 Newtons per square centimeter, between about 80 and about 250 Newtons per square centimeter, between about 90 and about 250 Newtons per square centimeter, or between about 100 and about 250 Newtons per square centimeter. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One of ordinary skill in the art will be familiar with kilogram-force-based units, and will understand that 1 kilogram-force is equivalent to about 9.8 Newtons.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least about 8 $kg_f/cm^2$, at least about 9 $kg_f/cm^2$, at least about 10 $kg_f/cm^2$, at least about 20 $kg_f/cm^2$, at least about 30 $kg_f/cm^2$, at least about 40 $kg_f/cm^2$, or at least about 50 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 8 $kg_f/cm^2$, at least about 9 $kg_f/cm^2$, at least about 10 $kg_f/cm^2$, at least about 20 $kg_f/cm^2$, at least about 30 $kg_f/cm^2$, at least about 40 $kg_f/cm^2$, or at least about 50 $kg_f/cm^2$ of externally-applied pressure, the lithium surface may become smoother with cycling when the pressing surface is smooth. As described herein, the pressing surface may be modified by choosing the appropriate material(s) positioned between the anode and the cathode.

In some cases, one or more forces applied to the cell have a component that is not normal to an active surface of an anode. For example, in FIG. 9B force 484 is not normal to first anode active surface portion 441. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

The anisotropic force described herein may be applied using any suitable method known in the art. In some embodiments, the force may be applied using compression springs. For example, the electrochemical device may be situated in an optional enclosed containment structure with one or more compression springs situated between current collector and/or current collector and the adjacent wall of containment structure to produce a force with a component in normal to an anode active surface (e.g., an anode active surface portion). In some embodiments, the force may be applied by situating one or more compression springs outside the containment structure such that the spring is located between an outside surface of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a folded multi-cell system as described herein) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, electrochemical devices may be pre-compressed before they are inserted into containment structures, and, upon being inserted to the containment structure, they may expand to produce a net force on the cell. Such an arrangement may be advantageous, for example, if the cell is capable of withstanding relatively high variations in pressure. In such embodiments, the containment structures may have a relatively high strength (e.g., at least about 100 MPa, at least about 200 MPa, at least about 500 MPa, or at least about 1 GPa). In addition, the containment structure may have a relatively high elastic modulus (e.g., at least about 10 GPa, at least about 25 GPa, at least about 50 GPa, or at least about 100 GPa). The containment structure may comprise, for example, aluminum, titanium, or any other suitable material.

In some embodiments, the use of certain electronically insulating regions and/or methods described herein may result in improved capacity after repeated cycling of the electrochemical device. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle. In some embodiments, the electrochemical device has a capacity of at least 20 mAh, 30 mAh, 40 mAh, 50 mAh, 60 mAh, 70 mAh, or 80 mAh at the end of the cell's third, 10th, 25th, 30th, 40th, 45th, 50th, or 60th cycle.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

As described above, certain embodiments of the inventive systems and/or methods include one or more processors, for example, associated with a sensor. The processor may be part of, according to certain embodiments, a computer-implemented control system. The computer-implemented control system can be used to operate various components of the system. In general, any calculation methods, steps, simulations, algorithms, systems, and system elements described herein may be implemented and/or controlled using one or more computer-implemented control system(s), such as the various embodiments of computer-implemented systems described below. The methods, steps, control systems, and control system elements described herein are not limited in their implementation to any specific computer system described herein, as many other different machines may be used.

The computer-implemented control system can be part of or coupled in operative association with one or more articles (e.g., electrochemical cells) and/or other system components that might be automated, and, in some embodiments, is configured and/or programmed to control and adjust operational parameters, as well as analyze and calculate values, for example any of the values described above. In some embodiments, the computer-implemented control system(s) can send and receive reference signals to set and/or control operating parameters of system apparatus. In other embodiments, the computer-implemented system(s) can be separate from and/or remotely located with respect to the other system components and may be configured to receive data from one or more inventive systems via indirect and/or portable means, such as via portable electronic data storage devices, such as magnetic disks, or via communication over a computer network, such as the Internet or a local intranet.

The computer-implemented control system(s) may include several known components and circuitry, including a processor, a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the computer system(s) may be a multi-processor computer system or may include multiple computers connected over a computer network.

The computer-implemented control system(s) may include a processor, for example, a commercially available processor such as one of the series x86; Celeron, Pentium, and Core processors, available from Intel; similar devices from AMD and Cyrix; the 680X0 series microprocessors available from Motorola; and the PowerPC microprocessor from IBM. Many other processors are available, and the computer system is not limited to a particular processor.

A processor typically executes a program called an operating system, of which WindowsNT, Windows95 or 98, Windows XP, Windows Vista, Windows 7, Windows 10, UNIX, Linux, DOS, VMS, MacOS, OS8, and OS X are examples, which controls the execution of other computer programs and provides scheduling, debugging, input/output control, accounting, compilation, storage assignment, data management and memory management, communication control and related services. The processor and operating system together define, in accordance with certain embodiments, a computer platform for which application programs in high-level programming languages are written. The computer-implemented control system is not limited to a particular computer platform.

In accordance with certain embodiments, the processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer-implemented control system(s) that implements the methods, steps, systems control and system elements control described above is not limited thereto. The computer-implemented control system(s) is not limited to a particular memory system.

At least part of such a memory system described above may be used to store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

It should be appreciated that one or more of any type of computer-implemented control system may be used to implement various embodiments described herein. Aspects of the invention may be implemented in software, hardware or firmware, or any combination thereof. The computer-implemented control system(s) may include specially programmed, special purpose hardware, for example, an application-specific integrated circuit (ASIC). Such special-purpose hardware may be configured to implement one or more of the methods, steps, algorithms, systems control, and/or system elements control described above as part of the computer-implemented control system(s) described above or as an independent component.

The computer-implemented control system(s) and components thereof may be programmable using any of a variety of one or more suitable computer programming languages. In addition, the methods, steps, algorithms, systems control, and/or system elements control may be implemented using any of a variety of suitable programming languages. Such languages may include procedural programming languages, for example, LabView, C, Pascal, Fortran, and BASIC, object-oriented languages, for example, C++, Java, and Eiffel, and other languages, such as a scripting language or even assembly language. In some embodiments, the computer programming language is Python. In some embodiments, the computer programming language is SQL.

Such methods, steps, algorithms, systems control, and/or system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, algorithm, system control, and/or system element control.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No.

9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

U.S. Provisional Application No. 62/785,332, filed Dec. 27, 2018, and entitled "Isolatable Electrodes and Associated Articles and Methods" is incorporated herein by reference in its entirety for all purposes. U.S. Provisional Application No. 62/785,335, filed Dec. 27, 2018, and entitled "Electrodes, Heaters, Sensors, and Associated Articles and Methods" is incorporated herein by reference in its entirety for all purposes. U.S. Provisional Application No. 62/785,338, filed Dec. 27, 2018, and entitled "Folded Electrochemical Devices and Associated Methods and Systems" is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
a substrate;
a plurality of discrete electrode segments adjacent to the substrate, the electrode segments comprising electrode active material; and
a current collector domain comprising:
a current collector bus, the current collector bus electronically coupled to the discrete electrode segments; and
a plurality of current collector segments, each current collector segment electronically coupled to an electrode segment,
wherein, for each of the current collector segments, the current collector segment is electronically coupled to the current collector bus via at least one current collector bridge, and wherein the article is configured such that, when the temperature of the article reaches a threshold temperature, at least one of the current collector bridges no longer couples the current collector segment associated with that current collector bridge to the current collector bus due, at least in part, to a heat-induced change in volume of the substrate.

2. The article of claim 1, wherein for each discrete electrode segment, the discrete electrode segment is electronically coupled to the current collector bus via at least one current collector segment.

3. The article of claim 1, wherein for each current collector segment, the current collector segment is disposed, at least partially, between the substrate and the electrode segment to which the current collector segment is electronically coupled.

4. The article of claim 1, wherein the heat-induced change in volume of the substrate is an increase in the volume of the substrate.

5. The article of claim 1, wherein the article is configured such that, when the temperature of the article reaches a threshold temperature, at least one of the current collector bridges undergoes ultimate tensile failure such that the at least one of the current collector bridges no longer electronically couples the current collector segment associated with that current collector bridge to the current collector bus due, at least in part, to a heat-induced change in volume of the substrate.

6. The article of claim 1, wherein the heat-induced change in volume of the substrate is a decrease in the volume of the substrate.

7. The article of claim 1, wherein the substrate has a negative thermal expansion coefficient at the threshold temperature.

8. The article of claim 1, wherein the threshold temperature has a value greater than or equal to 50° C.

9. The article of claim 8, wherein the threshold temperature has a value of less than or equal to 150° C.

10. The article of claim 1, wherein the electrode segments comprise lithium metal and/or a lithium alloy as the electrode active material.

11. An electrochemical cell comprising the article of claim 1.

12. A rechargeable battery comprising the electrochemical cell of claim 11.

13. An electric vehicle comprising the electrochemical cell of claim 11.

14. An article, comprising:
a substrate;
a plurality of discrete electrode segments adjacent to the substrate, the electrode segments comprising electrode active material; and
a current collector domain comprising:
a current collector bus, the current collector bus electronically coupled to the discrete electrode segments; and
a plurality of current collector segments, each current collector segment electronically coupled to an electrode segment,
wherein, for each of the current collector segments, the current collector segment is electronically coupled to the current collector bus via at least one current collector bridge, and wherein the article is configured such that, when the temperature of the article reaches a threshold temperature, at least one of the discrete electrode segments is no longer electronically coupled to the current collector bus due, at least in part, to a heat-induced change in volume of the substrate.

15. The article of claim 14, wherein the electrode segments comprise lithium metal and/or a lithium alloy as the electrode active material.

16. An electrochemical cell comprising the article of claim 14.

17. A rechargeable battery comprising the electrochemical cell of claim 16.

18. An electric vehicle comprising the electrochemical cell of claim 16.

19. An article, comprising:
a substrate;
a plurality of discrete electrode segments adjacent to the substrate, the electrode segments comprising electrode active material; and
a current collector domain comprising:
a current collector bus, the current collector bus electronically coupled to the discrete electrode segments; and
a plurality of current collector segments, each current collector segment electronically coupled to an electrode segment,
wherein, for each of the current collector segments, the current collector segment is electronically coupled to the current collector bus via at least one current collector bridge, and wherein the thermal expansion coefficient of the substrate is greater than the thermal expansion coefficient of the at least one current collector bridge.

20. The article of claim 19, wherein the electrode segments comprise lithium metal and/or a lithium alloy as the electrode active material.

21. An electrochemical cell comprising the article of claim 19.

22. A rechargeable battery comprising the electrochemical cell of claim 21.

23. An electric vehicle comprising the electrochemical cell of claim 21.

24. An article, comprising:
a substrate;
a plurality of discrete electrode segments adjacent to the substrate, the electrode segments comprising electrode active material; and
a current collector domain comprising:
    a current collector bus, the current collector bus electronically coupled to the discrete electrode segments; and
    a plurality of current collector segments, each current collector segment electronically coupled to an electrode segment,
wherein, for each of the current collector segments, the current collector segment is electronically coupled to the current collector bus via at least one current collector bridge, and wherein the substrate comprises a heat shrinkable film.

25. The article of claim 24, wherein the electrode segments comprise lithium metal and/or a lithium alloy as the electrode active material.

26. An article, comprising:
a substrate;
a plurality of discrete electrode segments adjacent to the substrate, the electrode segments comprising electrode active material; and
a current collector domain comprising:
    a current collector bus, the current collector bus electronically coupled to the discrete electrode segments; and
    a plurality of current collector segments, each current collector segment electronically coupled to an electrode segment,
wherein, for each of the current collector segments, the current collector segment is electronically coupled to the current collector bus via at least one current collector bridge, and wherein the substrate comprises polyvinyl alcohol.

27. The article of claim 26, wherein the electrode segments comprise lithium metal and/or a lithium alloy as the electrode active material.

28. An article, comprising:
a substrate;
a plurality of discrete electrode segments adjacent to the substrate, the electrode segments comprising electrode active material; and
a current collector domain comprising:
    a current collector bus, the current collector bus electronically coupled to the discrete electrode segments; and
    a plurality of current collector segments, each current collector segment electronically coupled to an electrode segment,
wherein, for each of the current collector segments, the current collector segment is electronically coupled to the current collector bus via at least one current collector bridge, and wherein the article is configured such that, when the article reaches a threshold current, at least one current collector bridge is mechanically deformed such that a current collector segment coupled to that current collector bridge is no longer electronically coupled to the current collector bus.

29. The article of claim 28, wherein the threshold current has a value greater than or equal to 10 A.

30. The article of claim 29, wherein the threshold current has a value of less than or equal to 120 A.

31. The article of claim 28, wherein the electrode segments comprise lithium metal and/or a lithium alloy as the electrode active material.

32. An electrochemical cell comprising the article of claim 28.

33. A rechargeable battery comprising the electrochemical cell of claim 32.

34. An electric vehicle comprising the electrochemical cell of claim 32.

35. An article, comprising:
a substrate;
a plurality of discrete electrode segments adjacent to the substrate, the electrode segments comprising electrode active material; and
a current collector domain comprising:
    a current collector bus, the current collector bus electronically coupled to the discrete electrode segments; and
    a plurality of current collector segments, each current collector segment electronically coupled to an electrode segment,
wherein, for each of the current collector segments, the current collector segment is electronically coupled to the current collector bus via at least one current collector bridge, and wherein the article further comprises a heater adjacent to the substrate configured to heat at least a portion of the substrate.

36. The article of claim 35, wherein the electrode segments comprise lithium metal and/or a lithium alloy as the electrode active material.

37. An electrochemical cell comprising the article of claim 35.

38. A rechargeable battery comprising the electrochemical cell of claim 37.

39. An electric vehicle comprising the electrochemical cell of claim 37.

40. An article, comprising:
a substrate;
a plurality of discrete electrode segments adjacent to the substrate, the electrode segments comprising electrode active material; and
a current collector domain comprising a current collector bus, the current collector bus electronically coupled to the discrete electrode segments;
wherein the article is configured such that when the temperature of the article reaches a threshold temperature, at least one of the electrode segments is no longer electronically coupled to the current collector bus due, at least in part, to a heat-induced change in volume of the substrate.

41. The article of claim 40, wherein the electrode segments comprise lithium metal and/or a lithium alloy as the electrode active material.

42. The article of claim 40, wherein the threshold temperature has a value greater than or equal to 50° C.

43. The article of claim 42, wherein the threshold temperature has a value of less than or equal to 150° C.

44. An electrochemical cell comprising the article of claim 40.

45. A rechargeable battery comprising the electrochemical cell of claim 44.

46. An electric vehicle comprising the electrochemical cell of claim 44.

47. A method, comprising:
changing a volume of a substrate that is part of an electrochemical device during charging and/or discharging of the electrochemical device, the electrochemical device comprising:
the substrate,
a plurality of discrete electrode segments adjacent to the substrate, the electrode segments comprising electrode active material, and
a current collector domain comprising a current collector bus, the current collector bus electronically coupled to the discrete electrode segments;
wherein the changing the volume of the substrate induces, at least in part, a loss of electronic coupling between at least one of the electrode segments and the current collector bus.

48. The method of claim 47, wherein the changing the volume of the substrate comprises heating the substrate.

49. The method of claim 47, wherein the loss of electronic coupling of the electrode segment from the current collector bus occurs when the temperature of the electrochemical device reaches a threshold temperature, wherein the threshold temperature has a value greater than or equal to 50° C.

50. The method of claim 49, wherein the threshold temperature has a value of less than or equal to 150° C.

51. The method of claim 47, wherein the electrode segments comprise lithium metal and/or a lithium alloy as the electrode active material.

52. The method of claim 47, wherein the electrochemical device is part of an electrochemical cell.

53. The method of claim 52, wherein the electrochemical cell is part of a rechargeable battery.

54. The method of claim 52, wherein the electrochemical device is part of an electric vehicle.

* * * * *